US006175639B1

United States Patent
Satoh et al.

(12) United States Patent
(10) Patent No.: US 6,175,639 B1
(45) Date of Patent: Jan. 16, 2001

(54) DIGITAL DATA ENCODE SYSTEM

(75) Inventors: Shinobu Satoh; Yutaka Wakasu, both of Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/028,571

(22) Filed: Feb. 24, 1998

(30) Foreign Application Priority Data

| Feb. 24, 1997 | (JP) | 9-038739 |
| Feb. 25, 1997 | (JP) | 9-040525 |
| Jun. 5, 1997 | (JP) | 9-148014 |

(51) Int. Cl.$^7$ .................................................. G06K 9/00
(52) U.S. Cl. ............................ 382/100; 380/51; 380/54; 380/40; 380/41; 382/232
(58) Field of Search ................................... 382/100, 232; 380/51, 54, 40, 41; 375/240; 341/200; 386/94, 95, 64; 358/501, 530; 345/150, 153

(56) References Cited

U.S. PATENT DOCUMENTS

| 4,939,515 | * | 7/1990 | Adelson | 341/51 |
| 5,319,735 | * | 6/1994 | Preuss et al. | 395/2.14 |
| 5,530,759 | * | 6/1996 | Braudaway et al. | 380/54 |
| 5,613,004 | * | 3/1997 | Cooperman et al. | 380/28 |
| 5,617,119 | * | 4/1997 | Briggs et al. | 345/611 |
| 5,825,892 | * | 10/1998 | Braudaway et al. | 380/51 |
| 5,875,249 | * | 2/1999 | Mintzer et al. | 380/54 |
| 5,915,027 | * | 6/1999 | Cox et al. | 380/54 |
| 5,930,369 | * | 7/1999 | Cox et al. | 380/54 |
| 5,933,534 | * | 8/1999 | Yoshimoto et al. | 382/236 |
| 5,991,426 | * | 11/1999 | Cox et al. | 382/100 |

FOREIGN PATENT DOCUMENTS

| 690 595 | 1/1996 | (EP) . |
| 5-30466 | 2/1993 | (JP) . |
| 5-236424 | 9/1993 | (JP) . |
| 6-315131 | 11/1994 | (JP) . |
| 6-339110 | 12/1994 | (JP) . |
| 8-241403 | 9/1996 | (JP) . |
| 96/41468 | 12/1996 | (WO) . |

* cited by examiner

Primary Examiner—Andrew W. Johns
Assistant Examiner—Jacques Veillard
(74) Attorney, Agent, or Firm—Foley & Lardner

(57) ABSTRACT

A digital data encode system for inserting water mark data into digital data signals having a series of field data by use of a water mark data inserting device, the digital data encode system has a field judging unit dividing the digital data signals by a predetermined reference, a water mark data selection output unit for selecting proper one of a plurality of different water mark data prepared correspondingly to the division according to the judgment result of the field judging unit, and a water mark data inserting device for inserting the water mark data supplied from the water mark data selection output unit into the digital data signals.

13 Claims, 13 Drawing Sheets

DIGITAL DATA ENCODE SYSTEM

BACKGROUND OF THE INVENTION

1. Field of the Invention

The present invention relates to a digital data encode system and a water mark data inserting method for inserting water mark data in the digital data signal having a series of field data.

2. Description of the Related Art

Recently, there has arisen the necessity of developing means for preventing illegal copying of digital data, especially digital image data, with the advance of an information processor and a communication network and the electronization of various media.

Data encryption technique has been proposed as this kind of technique for preventing illegal copying. This digital data encryption technique is, for example, to enable it to reproduce the encrypted digital image data in only a reproducing system having a proper cryptoanalysis key when digital image data is encrypted. The conventional encryption technique, however, has such a defect that if the encryption code is once broken, it cannot protect against the illegally copying thereafter.

Therefore, a technique by use of water mark data is proposed, as another technique for preventing illegal copying of digital data, free from such a defect as a digital encryption technique has. Water mark data (digital water mark) is the special information to be embedded in digital image data itself in order to prevent the illegal use and copying of the digital image data. It includes, for example, information for authenticating the copyright ownership and judging the infringement of the copyright, and the copy protected information for preventing illegal copying itself.

Such water mark data to be inserted in the digital image data includes two kinds of visible water mark data and invisible water mark data. Visible water mark data means such a special character, symbol, or other data to be inserted in the image that a person who sees the image with the water mark data combined therewith may perceive the water mark visually. This kind of visible water mark data would naturally cause the deterioration of the image quality. While, it is effective in visually appealing protection against illegal copy or illegal data fluid.

A conventional visible water mark data embedding technique is disclosed in, for example, Japanese Patent Publication Laid-Open (Kokai) No. Heisei 8-241403, "Digital Watermarking Free from Image Color Change" (hereinafter, referred to as the conventional technique 1). According to the water mark data inserting method of the conventional technique 1, when combining visible water mark data with the original image data, the water mark data is combined with the original image data in a way of changing only the brightness of the pixel corresponding to the non-transparent part of the water mark data without changing the chromaticities, of all pixels of the original data. At this time, the scaling value for changing the brightness component of a pixel is determined by the value of, for example, chromatic component, random numbers, and pixels of water mark data.

Another example of the conventional visible water mark data embedding technique is disclosed in, for example, Japanese Patent Publication Laid-Open (Kokai) No. Heisei 5-236424, "Information Embedding Method and Its Apparatus" (hereinafter, referred to as the conventional technique 2). The water mark data inserting method according to the conventional technique 2 comprises detecting means for detecting a region meeting a predetermined condition from image data, thereby to embed the water mark in every image data at the position corresponding to the region meeting the condition. The position for embedding the water mark depends on the content of the image. Therefore, it is very difficult to remove the water mark without much deteriorating the image quality.

On the other hand, invisible water mark data means such special data to be inserted in the image that a person who sees the image with the water mark data combined therewith cannot perceive the water mark visually. This kind of invisible water mark data is embedded in the original image data in consideration of causing no natural deterioration of the image quality. As is understood from this, invisible water mark data is preferable to visible water mark data under the condition that a water mark preferably exists outside of the image data to be protected.

The water mark data inserting technique by use of an invisible water mark causes little image deterioration and when embedding special information enabling the identification of a writer as water mark data, it can specify the writer by detecting the water mark data even after illegal copying is performed. By embedding the copy protected information for disapproving copying or the copy prohibited information for prohibiting copying, in the original image data, and providing a reproducing device for reproducing the image data with a special function corresponding to the information, for example, it is possible to notify a user of the reproducing device that the image data is the copy inhibited data and to operate the special function within the reproducing device (copy protection function or the like) so as to restrict copying into VTR (Video Tape Recorder) when the reproducing device detects the copy protected information or the like.

As the technique of embedding the invisible water mark data in digital image, there is, for example, a technique of embedding the special information as a water mark in the digital image at the least influenced portion to the image quality in the pixel data (for example, LSB (Least Significant Bit)). This kind of the conventional invisible water mark data embedding technique is disclosed in, for example, Japanese Patent Publication Laid-Open (Kokai) No. Heisei 6-339110, "Image Information Transfer Method, Image Information Recording Device and Image Information Reproducing Device" (hereinafter, referred to as the conventional technique 3). The water mark data inserting method according to the conventional technique 3 transmits the image signal together with the copyright information and the generation information overlapping each other, to the space other than the valid image space displayed on a screen of the image signal, and performs the generation restriction of the copy according to the copyright information and the generation information included in the received image signal at a receiver side.

The invisible water mark data embedding technique, however, is defective in that only the water mark data is easily removed from the image data with water mark data embedded therein, without deteriorating the quality of the original image data. For example, the information corresponding to the LSB of the pixel data will be lost by use of a low pass filter. Generally, the image compression processing aims to reduce the data amount on the whole by diminishing the information amount with respect to the least influenced portion to the quality in the pixel data. Therefore, the water mark data embedded in the least influenced portion to the quality in the pixel data will be lost in the image compression processing. As mentioned above, the invisible water mark embedding technique has such a defect that it may be difficult to re-detect the water mark data in some cases.

Therefore, a technique of embedding invisible water mark data in a digital image as well as diffusing the water mark data into the frequency spectrum after frequency conversion of the image data (hereinafter, referred to as the conventional technique 4) is presented (refer to Nikkei Electronics p.13 (no. 660) 4.22.1996). Since water mark data is embedded in the frequency component of the image data to be processed according to the conventional technique 4, the water mark data is robust against the image compression processing and the image processing such as filtering, and the water mark data won't be lost. Further, random numbers according to the normal distribution are used as the water mark data, thereby preventing the interference of the respective water mark data even in the case of embedding a plurality of water mark data. Therefore, according to the conventional technique 4, it is difficult to destroy only the water mark data without much influence to the whole image data.

The conventional technique 4 will be, hereinafter, described with reference to FIG. 12. The water mark encode system according to the conventional technique 4 comprises, for example, discrete cosine transform (DCT) means 1210, water mark data output means 1230 storing the water mark data 1231, a water mark data inserting device 1240, and inverse discrete cosine transform (inverse DCT) means 1250. The DCT is adopted here as only one example of spectrally resolving means of original image data, and any other conversion means than the DCT will do.

In thus-constituted conventional technique 4, original image data is converted into frequency components by DCT, and n piece of data indicating higher frequency value are selected, each defined as $f(1), f(2), \ldots, f(n)$. On the other hand, each water mark data $w(1), w(2), \ldots, w(n)$ are selected from the normal distribution having a mean value 0 and a variance 1, and $F(i)=f(i)+\alpha|f(i)|*w(i)$ is calculated with respect to each i (where $i=1, 2, \ldots, n$: hereinafter in the same way). Where, $\alpha$ is a scaling element. At the end, the image data with the water mark data embedded therein can be obtained as the frequency components by the replacement of $f(i)$ with $F(i)$.

The water mark data detection according to the conventional technique 4 is performed in the following method, by way of example. The original image data and the water mark data candidate $w(i)$ must be known values in the detecting method of the conventional technique 4. At first, the image data with the water mark data embedded therein is converted into the frequency components by use of DCT or the like, the element values corresponding to $f(1), f(2), \ldots, f(n)$ having the water mark data embedded therein in the frequency band are defined as $F(1), F(2), \ldots, F(n)$. By the use of $f(i)$ and $F(i)$, the water mark data $W(i)$ is extracted, calculated by $W(i)=(F(i)-f(i))/f(i)$. Next, the statistical similarity C of $w(i)$ and $W(i)$ is calculated by use of the inner product of vector by $C=W*w/(WD*wD)$. Where, $W=(W(1), W(2), , W(n))$, and $w=(w(1), w(2), \ldots, w(n))$, WD is the absolute value of the vector W, and wD is the absolute value of the vector w. As the result of the above calculation, when the statistical similarity C is a particular constant value or the more, it can be judged that the above-mentioned water mark data candidate has been embedded in the image data.

If creating the image data with the water mark embedded therein by embedding the water mark data in the original image data by use of the conventional technique 4 as mentioned above, it is effective for a writer owing the original image data to judge the illegality of the digital image data which may be illegal copy.

The conventional technique 4 requires original image data and water mark data candidate $w(i)$ in order to detect the water mark data as mentioned above. Therefore, it is effective for a writer owing the original image to detect any illegally-copied image data, however, a reproducing device of a terminal used by a general user, because of having no original image, cannot perform the detecting processing of the water mark data. Then, a further improved technique than the conventional technique 4 for terminal processing, especially MPEG system (hereinafter, referred to as the conventional technique 5) is proposed.

In the conventional technique 5, original image is divided into blocks of 8 pixels×8 pixels and the water mark data embedding and detection is performed by use of the block unit for processing. In the water mark data embedding processing, the data is defined as $f(1), f(2), \ldots, f(n)$ sequentially from the lowest frequency component of AC component in the frequency band after discrete cosine transform in the MPEG encode processing, the water mark data $w(1), w(2), \ldots, w(n)$ are selected from the normal distribution having a mean value 0 and a variance 1, and $F(i)=f(i)+\alpha\times avg(f(i))\times w(i)$ is calculated with respect to each i. Where, $\alpha$ is a scaling element and avg $(f(i))$ is a partial average obtained by averaging the absolute values of three points around $f(i)$, for example, $f(i-1), f(i)$, and $f(i+1)$. The processing later than the MPEG encode processing will be performed by replacing $f(i)$ with $F(i)$.

On the other hand, detection of the water mark data will be performed in the following method. This detecting method requires no original image data and that only the data candidate $w(i)$ (where, $i=1, 2, \ldots, n$) must be a known value. In the block frequency band of blocks after inverse quantization of the MPEG decoding processing, the data from the lowest frequency component is sequentially defined as $F(1), F(2), \ldots, F(n)$. The average of the absolute values of three points around $F(i)$ is defined as the partial average avg $(F(i))$, the water mark data $W(i)$ is calculated by $W(i)=F(i)/avg(F(i))$, and the total $WF(i)$ of $W(i)$ for one image is calculated for every i. By use of the inner product of vectors, the statistical similarity of $w(i)$ and $WF(i)$ is calculated by $C=WF\times w/(WFD\times wD)$. Where, $W=(WF(1), WF(2), \ldots, WF(n))$, $w=(w(1), w(2), \ldots, w(n))$, WFD is the absolute value of the vector WF, and wD is the absolute value of the vector w. When the statistical similarity C is a particular constant value or the more, it can be judged that the water mark data has been embedded in the image data.

Insertion of a plurality of water mark data into one original image data can be adopted in order to attach a plurality of information such as writer information and copy protected information, to one image data. The conventional techniques 4 and 5, however, is defective in making the circuit size larger because of inserting a plurality of water mark data in one original image data and increasing the processing procedure. Namely, the conventional techniques 4 and 5 disclose a technique of inserting one water mark data in one original image data, however, with no consideration taken to the case of inserting a plurality of water mark data (for example, two water mark data) in one original image data. Therefore, when inserting, for example, two water mark data therein, different water mark data 1231 and 1232 must be separately inserted by two water mark data inserting devices 1241 and 1242, or two water mark data must be inserted by letting them pass one water mark data inserting device twice.

Another example of the conventional technique of embedding water mark in a digital image is disclosed in Japanese Patent Publication Laid-Open (Kokai) No. Heisei 6-315131, "Information Embedding Device And Reproducing Device" (hereinafter, referred to as the conventional technique 6). The conventional technique 6 detects an area having no deterioration of the image even if replacing the data at the peripheral area when reproducing the information, for example, an equal background portion, by use of the relationship between a series of frames, and converts the level of the area to be converted, so to embed particular information therein. When reproducing the information, the area with the identification data embedded therein is specified by use of the signal lacked portion and the conversion information, and corrected so as to reconstruct the image.

The conventional technique 6, however, cannot embed the water mark information in all the frames, so that the frame with no water mark embedded therein is unable to protect against illegal copying. Since this technique is on the assumption that successive frames are of freeze-frame pictures and that there is no change on the successive frames, an area for embedding the water mark data cannot be specified in the moving images of violence action, thereby making it impossible to embed the water mark data therein.

Further another example of the conventional technique of embedding water mark in a digital image is disclosed in, for example, Japanese Patent Publication Laid-Open (Kokai) No. Heisei 5-30466, "Image Signal Recording Device and Signal Recording Medium" (hereinafter, referred to as the conventional technique 7). The conventional technique 7 converts image signals by frequency and embeds the information having the frequency signal lower than the frequency band of the image signal after frequency conversion. By the use of a high pass filter, the original image is taken out and the identification data embedded therein is taken out by the use of a low pass filter.

However, since the conventional technique 7 embeds the water mark data in the lower frequency portion in the frequency band after frequency conversion of the image data, the water mark data can be easily removed by use of a high pass filter. When embedding the water mark data in the intensive frequency portion after frequency conversion, a filter cannot remove the water mark, but when inserting a plurality of water mark data, it cannot help deteriorating the image quality.

SUMMARY OF THE INVENTION

An object of the present invention is to provide a digital data encode system and a water mark data inserting method capable of inserting a plurality of water mark data in one original image data.

Another object of the present invention is, in addition to the above object, to provide a digital data encode system and a water mark data inserting method capable of inserting a plurality of water mark data in one original image data in the circuit of the same size as that of the conventional digital data encode system.

According to the first aspect of the invention, a digital data encode system having a water mark data inserting device for inserting water mark data into digital data signals having a series of field data, comprising, a water mark data inserting control means for controlling inserting of the water mark by the water mark data inserting device;

wherein the water mark data inserting control means divides the digital data signals by a predetermined reference and inserts a plurality of different water mark data prepared correspondingly to the division into the respective digital data of the corresponding divisions by use of the water mark data inserting device.

In the preferred construction, the digital data signals are of a digital data signal having a series of field data consisting of odd fields and even fields of a series of image frames, and the water mark data inserting control means inserts first and second water mark data different from each other and prepared for every odd field and every even field into the respective corresponding fields, by use of the water mark data inserting device.

In the preferred construction, the digital data signals are of a digital data signal having a series of field data consisting of odd fields and even fields in a series of image frames, and the water data inserting control means comprising a field judging means for judging whether the field data under processing is of an odd field or an even field upon receipt of the digital data signals, and a water mark data selection output means, storing first and second water mark data different from each other and prepared for every odd field and every even field, for supplying the first water mark data to the water mark data inserting device when the judgment result designates the odd field, or supplying the second water mark data to the water mark data inserting device when the judgment result designates the even field, depending on the judgment result by the field judging means.

In the preferred construction, the water mark data inserting control means inserts a plurality of different water mark data prepared for every signal component of the digital data signals extracted by a predetermined reference into the respective digital data signals of the corresponding signal components, by use of the water mark data inserting device.

In the preferred construction, the water mark data inserting control means comprising a signal component judging means for, upon receipt of the digital data signals, judging whether the signal component of the digital data signal under processing is brightness component, first color-difference component, or second color-difference component, and a water mark data selection output means, storing three kinds of different water mark data prepared for every signal component of the above three kinds, for supplying the water mark data prepared correspondingly to the brightness component to the water mark data inserting device when the judging result designates the brightness component, supplying the water mark data prepared correspondingly to the first color-difference component to the water mark data inserting device when the judgment result designates the first color-difference component, or supplying the water mark data prepared correspondingly to the second color-difference component to the water mark data inserting device when the judgment result designates the second color-difference component, depending on the judgment result of the signal component judging means.

In another preferred construction, the water mark data inserting control means comprising a signal component judging means for, upon receipt of the digital data signals, judging whether the signal component of the digital data signal under processing is red-component, green-component, or blue-component, and a water mark data selection output means, storing three kinds of different water mark data prepared for every signal component of the above three kinds, for supplying the water mark data prepared correspondingly to the red-component to the water mark data inserting device when the judgment result designates the red-component, supplying the water mark data prepared correspondingly to the green-component to the water mark data inserting device when the judgment result designates the green-component, or supplying the water mark data prepared correspondingly to the blue-component to the water mark data inserting device when the judgment result designates the blue-component, depending on the judgment result of the signal component judging means.

In another preferred construction, the digital data encode system further comprises a spectrally-resolving means for spectrally resolving the digital data signals upon receipt of them and supplying the obtained resolved signals to the water mark data inserting device as a subject of inserting the water mark data therein.

In another preferred construction the digital data encode system further comprises a spectrally-resolving means for spectrally resolving the digital data signals upon receipt of then, and supplying the obtained resolved signals, as a subject of inserting the water mark data therein, to the water mark data inserting device, and an inversely-converting means, receiving the processed signals with the water mark data inserted therein by the water mark data inserting device, for inversely converting the spectrally-resolved data and supplying the obtained inversely-converted signals as water mark-embedded digital data signals.

In another preferred construction the digital data encode system further comprises a discrete cosine transform means for performing discrete cosine transform on the digital data signals upon receipt of them and supplying the obtained transformed signals to the water mark data inserting device as a subject of inserting the water mark data therein, and an inverse discrete cosine transform means, receiving the processed signals with the water mark data inserted therein by the water mark data inserting device, for performing inverse discrete cosine transform on them and supplying the obtained inversely-transformed signals as water mark-embedded digital data signals.

In another preferred construction, the digital data encode system further comprises a spectrally-resolving means for spectrally resolving the digital data signals upon receipt of them and supplying the obtained resolved signals to the water mark data inserting device as a subject of inserting the water mark data therein, a sampling means for sampling the processed signals with the water mark data inserted therein by the water mark data inserting device to supply sampling signals, and an image compression means for converting the sampling signals into image-compressed signals and supplying the obtained digital data compression data signals with the water mark embedded therein.

In another preferred construction, the digital data signals being of a digital data signal consisting of a series of image frames, further comprises an encoding means for encoding the digital signals with the water mark data inserted therein by use of the water mark data inserting device, and an encode controlling means for controlling the encoding means so as to perform encoding processing in a plurality of kinds of picture types corresponding to the encoding methods, the water mark data inserting control means comprises water mark data storing means for storing a plurality of different water mark data prepared correspondingly to a plurality of picture types for use in the encoding means and the encode controlling means, and a water mark data selection output means for, depending on the picture type decided by the encode controlling means, selecting the corresponding water mark data from the water mark data storing means and supplying it to the water mark data inserting device.

In another preferred construction, the digital data signals being of a digital data signal consisting of a series of image frames, further comprises a spectrally-resolving means for dividing the image of the digital data signals into blocks of a predetermined size, spectrally resolving the corresponding digital data signals in every block, and supplying the obtained resolved signals to the water mark data inserting device as a subject of inserting the water mark data therein, an encoding means for encoding the digital signals with the water mark data inserted therein by use of the water mark data inserting device, and an encode controlling means for controlling the encoding means so as to perform encoding processing in a plurality of kinds of picture types, the water mark data inserting control means comprises water mark data storing means for storing a plurality of different water mark data prepared correspondingly to a plurality of picture types for use in the encoding means and the encode controlling means, and a water mark data selection output means for, depending on the picture type decided by the encode controlling means, selecting the corresponding water mark data from the water mark data storing means and supplying it to the water mark data inserting device, the water mark data inserting device comprises a partial average calculator for calculating the average of the absolute values of three points around each element in the resolved signals supplied from the spectrally-resolving means, as a partial average, a first multiplier for multiplying the water mark data supplied from the water mark data inserting control means by the output data of the partial average calculator in every element, a second multiplier for multiplying each element of the output data of the first multiplier by a predetermined constant, and an adder for adding the output data of the second multiplier and the resolved signals supplied from the spectrally-resolving means in every element.

According to the second aspect of the invention, a digital data encode system having a water mark data inserting unit including a water mark data inserting control means for inserting water mark data into digital data signals having a series of field data by control of a water mark data inserting device and a water mark data detecting unit including a water mark data detecting means for detecting the water mark data from the digital data signals with the water mark data added thereto by the water mark data inserting unit, the digital data signals being of a digital data signal consisting of a series of image frames;

the water mark data inserting unit further comprising an encoding means for encoding the digital data signals with the water mark data inserted therein by use of the water mark data inserting device, and an encode controlling means for controlling the encoding means so as to perform encoding processing in a plurality of kinds of picture types corresponding to the encoding methods;

the water mark data inserting control means comprising first water mark data storing means for storing a plurality of different water mark data prepared correspondingly to a plurality of picture types for use in the encoding means and the encode controlling means, and a water mark data selection output means for, depending on the picture type decided by the encode controlling means, selecting the corresponding water mark data from the first water mark data storing means and supplying it to the water mark data inserting device, the water mark detecting unit comprising
  a decoding means for decoding the digital data signals encoded by the encoding means of the water mark data inserting device, and
  a display controlling means for controlling display depending on the data decoded by the decoding means according to the content of the water mark data inserted in the digital data signals or according to its presence;
the water mark data detecting means comprising
  a water mark data extracting device for extracting candidate data, that is a candidate of the water mark data, from the data decoded by the decoding means,
  a second water mark data storing means for storing the same water mark data as the plurality of water mark data stored in the first water mark data storing means of the water mark data inserting control means in the water mark data inserting device,
  a water mark data selection output means for selecting the corresponding water mark data from the second water mark data storing means according to the picture type in the encoding processing to be recognized in the decoding processing by the decoding means and supplying it, and
  a statistical similarity judging mean for making a comparison between the candidate data extracted by the water mark data extracting device and the water mark data supplied by the water mark data selection output means, judging the statistical similarity thereof, and notifying the display controlling means of the judgment result.

In the preferred construction, the water mark data inserting unit further comprises a spectrally-resolving means for dividing the image of the digital data signals into blocks of a predetermined size, spectrally resolving the corresponding digital data signals in every block, and supplying the obtained resolved signals to the water mark data inserting device as a subject of inserting the water mark data therein;
  the water mark data inserting device comprises a partial average calculator for calculating the average of the absolute values of three points around each element in the resolved signals supplied from the spectrally-resolving means, as a partial average, a first multiplier for multiplying the water mark data supplied from the water mark data inserting control means by the output data of the partial average calculator in every element, a second multiplier for multiplying each element of the output data of the first multiplier by a predetermined constant, and an adder for adding the output data of the second multiplier and the resolved signals supplied from the spectrally-resolving means in every element,
  the water mark data extracting device of the water mark data detecting means comprises a partial average calculator for calculating the average of the absolute values of three points around the block data decoded by the decoding means as a partial average, and a divider for dividing the block data decoded by the decoding means by the output data of the partial average calculator.

According to the third aspect of the invention, a water mark data inserting method for inserting water mark data in digital data signals having a series of field data by use of a water mark data inserting device, comprising
  a step of, after dividing the digital data signals by a predetermined reference, inserting a plurality of different water mark data prepared correspondingly to the division into the respective digital data of the corresponding divisions, by use of the water mark data inserting device.

In the preferred construction, the digital data signals are of a digital data signal having a series of field data consisting of odd fields and even fields of a series of image frames,
  further comprising the steps of:
    a step of storing first and second water mark data different from each other and prepared for every odd field and every even field,
    a step of judging whether the digital data signal is of the odd field or the even field one after another,
    a step of selecting one of the first and second water mark data as the water mark data to be inserted in the digital data signals, according to the judgment result in the field judging step,
    a step of spectrally resolving the digital data signals, and
    a step of, with respect to the frequency analyzed data, as a subject of inserting the water mark data therein, obtained as a result of the spectrum resolution in the spectrally resolving step, inserting the first water mark data into the frequency analyzed data of the odd field or inserting the second water mark data into the frequency analyzed data of the even field, according to the selection result in the water mark data selecting step.

In the preferred construction, the water mark data inserting method further comprises a step of storing three kinds of different water mark data prepared for every brightness component, first color-difference component, and second color-difference component in the signal components of the digital data signals, a step of judging the signal components of the digital data signals one after another, a step of selecting one of the above three kinds of water mark data as the water mark data to be inserted in the digital signal data, according to the judgment result in the signal component judging step, a step of spectrally resolving the digital data signals, and a step of, with respect to the frequency analyzed data, as a subject of inserting the water mark data therein, obtained as a result of the spectrum resolution in the spectrally resolving step, inserting the water mark data prepared correspondingly to the brightness component into the data of the brightness component, inserting the water mark data prepared correspondingly to the first color-difference component into the data of the first color-difference component, or inserting the water mark data prepared correspondingly to the second color-difference component into the data of the second color-difference component, according to the selection result in the water mark data selecting step.

In the preferred construction, the water mark data inserting method further comprises a step of storing three kinds of different water mark data prepared for every red-component, green-component, and blue-component in the signal components of the digital data signals, a step of judging the signal components of the digital data signals one after another, a step of selecting one of the above three kinds of water mark data as the water mark data to be inserted in the digital signal data, according to the judgment result in the signal component judging step, a step of spectrally resolving the digital data signals, and a step of, with respect to the frequency analyzed data, as a subject of inserting the water mark data, obtained as a result of the spectrum resolution in the spectrally resolving step, inserting the water mark data prepared correspondingly to the red-component into the data of the red-component, inserting the water mark data prepared correspondingly to the green-component into the data of the green-component, or inserting the water mark data prepared correspondingly to the blue-component into the data of the blue-component, according to the selection result in the water mark data selecting step.

In another preferred construction, the water mark data inserting method further comprises a step of storing a plurality of different water mark data prepared for every plurality of picture types corresponding to the encoding methods in encoding the digital data signals, a step of judging the signal components of the digital data signals one after another, a step of selecting one of the above three kinds of water mark data, as the water mark data to be inserted in the digital signal data, according to the judgment result in the signal component judging step, a step of spectrally resolving the digital data signals, and a step of, with respect to the frequency analyzed data, as a subject of inserting the water mark data therein, obtained as a result of the spectrum resolution in the spectrally resolving step, inserting the water mark data prepared correspondingly to the picture type, according to the selection result in the water mark data selecting step.

According to another aspect of the invention, a computer readable memory for storing a control program for controlling a digital data encode system having a water mark data inserting control means for inserting water mark data into digital data signals having a series of field data by use of a water mark data inserting device, the control program comprising a step of, after dividing the digital data signals by a predetermined reference, inserting a plurality of different water mark data prepared correspondingly to the division into the respective digital data of the corresponding division, by use of the water mark data inserting device.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, wellknown structures are not shown in detail in order to unnecessary obscure the present invention.

Figure 1:
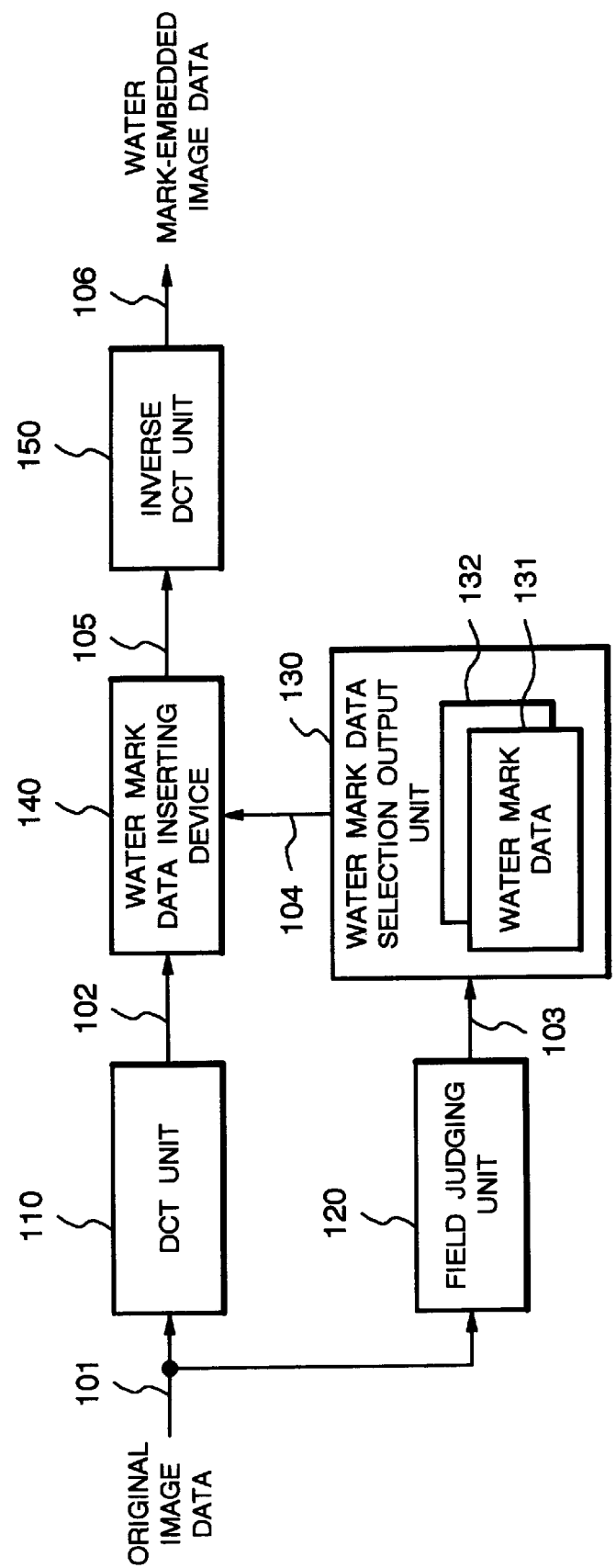
FIG. 1 is a block diagram showing a constitution of a digital data encode system according to a first embodiment of the present invention.

FIG. 1 is a block diagram showing a constitution of a digital data encode system according to a first embodiment of the present invention. With reference to FIG. 1, the encode system of the embodiment comprises a DCT (discrete cosine transform) unit 110, a field judging unit 120, a water mark data selection output unit 130, a water mark data inserting device 140, and an inverse DCT (inverse discrete cosine transform) unit 150. FIG. 1 shows only the characteristic components of the embodiment, while the description of other general components is not shown there.

Each component may be realized by an information processor and a storage controlled by a computer program (hereinafter, referred to as a control program) in a personal computer, a work station or the other computer system. The information processor includes an internal memory for storing data, a signal input port, and a signal output port, and executes processing according to the control program. Any signal input port will do as far as it can receive original image data or its corresponding data, and any signal output port will do as far as it can supply the water mark-embedded image data, water mark-embedded MPEG stream, or its corresponding data. The control program can be provided stored in a magnetic disk, a semiconductor memory, or other storing medium, so to be loaded in the information processor. A storing medium is not restricted to a particular form, but will do as far as an information processor can read out therefrom.

In the above components, upon receipt of the digital data signal (hereinafter, referred to as the original image data) 101 having a series of field data consisting of odd fields and even fields in a series of image frames, the DCT unit 110 performs discrete cosine transform and supplies a frequency component signal 102 to the water mark data inserting device 140. The original image data having such a data structure includes a digitalized interlace signal obtained by interlaced scanning, for example, similarly to the television signal in NTSC (National Television System Committee) method. In this case, the original image data 101 has a data structure where odd fields and even fields are disposed by turns. However, in the present invention, it is not restricted to this structure but it will do as far as the boundary between each field is definite.

The field judging unit 120, upon receipt of the original image data 101, judges whether the field under processing is odd field or even field, and supplies the field judgment information 103 indicating the judgment result to the water mark data selection output unit 130. Field may be judged by use of a synchronous signal, for example, in case of the interlaced signal as mentioned above. Alternatively, when the original image data 101 has a data structure where another information for indicating odd field or even field is attached to each field, the field may be judged by use of the information. Namely, it is preferable to select and change the field judgment method in the field judging unit 120 properly according to the data structure of the original image data 101.

The water mark data selection output unit 130 is storing a first and second water mark data 131 and 132. The water mark data selection output unit 130, upon receipt of the field judgment information 103 supplied from the field judging unit 120, judges whether the field judgment information 103 designates an odd field or an even field. Further, the water mark data selection output unit 130 selects the first water mark data 131 when the field judgment information 103 designates an odd field, and supplies it as the water mark data 104 to the water mark data inserting device 140. While, the water mark data selection output unit 130 selects the second water mark data 132 when the field judgment information 103 designates an even field, and supplies it as the water mark data 104 to the water mark data inserting device 140.

The water mark data inserting device 140, upon receipt of the frequency component signal 102 from the DCT unit 110 and the water mark data 104 selected and supplied by the water mark data selection output unit 130, inserts the water mark data 104 in the frequency component signal 102 and supplies the frequency component signal 105 with the water mark-embedded therein to the inverse DCT unit 150. The water mark data inserting device 140 may have the same structure as the water mark data inserting device 1240 of the above-mentioned conventional technique 4. The frequency component signal 102 is obtained by converting the original image data 101 in the frequency components, naturally including the content corresponding to the odd and even fields. The water mark data 104 received from the water mark data selection output unit 130 is selected correspondingly to the field as mentioned above. Accordingly, even in the case where the water mark data inserting device 140 has the same structure as the conventional technique, if the water mark data 104 is inserted in the frequency component signal 102 according to the selection result of the water mark data selection output unit 130, the first water mark data 131 can be embedded in the content corresponding to the odd field of the original image data 101 and the second water mark data 132 can be embedded in the content corresponding to the even field.

Upon receipt of the water mark-embedded frequency component signal 105 supplied from the water mark data inserting device 140, the inverse DCT unit 150 performs inverse discrete cosine transform and supplies the water mark-embedded image data 106.

With reference to the flow chart of FIG. 2, an operation of the embodiment will be described. As mentioned above, when realizing the encode system of the embodiment in a computer system, a control program for controlling the information processor includes, at least, instructions for the information processor performing the following respective steps, thereby making the information processor insert the water mark data in the original image data supplied from the signal input port.

At first, the first and second water mark data 131 and 132 are stored into the memory of the water mark data selection output unit 130 (Step 201). At this time, the first and second water mark data 131 and 132 may be stored in the same storing medium together with the control program, or they may be provided separately from the control program, which is not subject to any restriction.

When the signal input port receives the original image data 101, the field judging unit 120 makes a judgment of the field with respect to the received original data one after another whether it is an odd field or an even field (Step 202).

According to the judgment result by the field judging unit 120 in Step 202, the water mark data selection output unit 130 selectively assigns the first water mark data to the odd field and the second water mark data to the even field and supplies as such (Step 203).

The DCT unit 110 performs the discrete cosine transform processing on the received original image data 101 (Step 204). Any processing will do in this step as far as it is the processing of converting the original image data 101 in the frequency components by the spectrum resolution. Though this step is positioned after Step 203 in FIG. 2, it shall be actually performed simultaneously with Steps 202 and 203.

The water mark data inserting device 140, according to the selection result of the water mark data selection output unit 130 in Step 203, inserts the first water mark data in the odd field and inserts the second water mark data in the even field (Step 205), in the resultant data 102 obtained through the spectrum resolution by the DCT unit 110 in Step 204.

The inverse DCT unit 105 thereafter converts the water mark-embedded frequency component signal 105 supplied from the water mark data inserting device 140 into the image data and supplies the same (Step 206).

Thus, according to the digital data encode system of this embodiment, the water mark-embedded image data with two water mark data embedded therein can be obtained. Further, according the embodiment, two water mark data can be inserted by the use of one water mark data inserting device. Therefore, two water mark data can be inserted by use of the same circuit size as the conventional technique 4.

To make the description clearly, this embodiment has been described with individual functions as the DCT unit 110, the field judging unit 120, the water mark data selection output unit 130, and the water mark data inserting device 140. Otherwise they may be all integrated in water mark data inserting means. At this time, the signal supplied from the water mark data inserting means is the same as the water mark-embedded frequency component signal 105 supplied from the water mark data inserting device 140. If the water mark data inserting means includes the inverse DCT unit 150, the signal supplied from the water mark data inserting means is the same as the water mark-embedded image data 106.

Though the DCT unit 110 is adopted here, by way of an example of means for supplying the resolution signal (frequency component signal 102) through the spectrum resolution, any means will do as far as it can convert the input signal in the frequency components.

Figure 2:
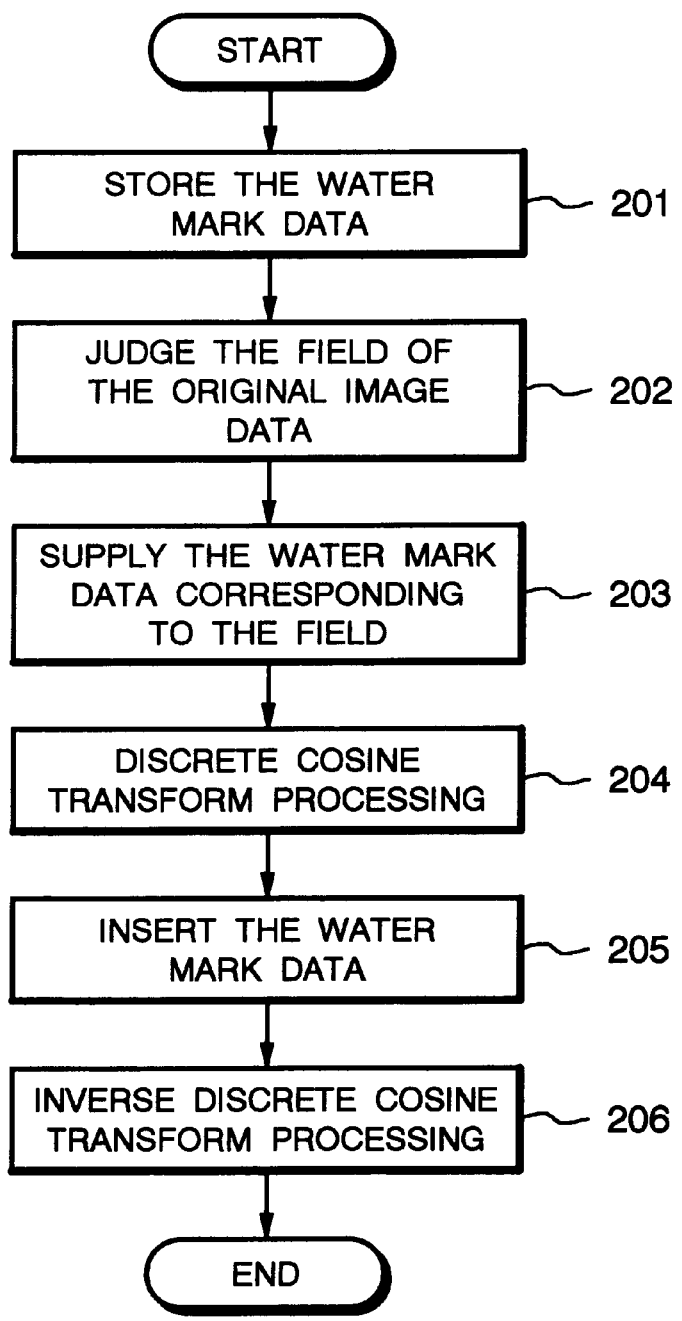
FIG. 2 is a flow chart showing an operation of the first embodiment.
Figure 3:
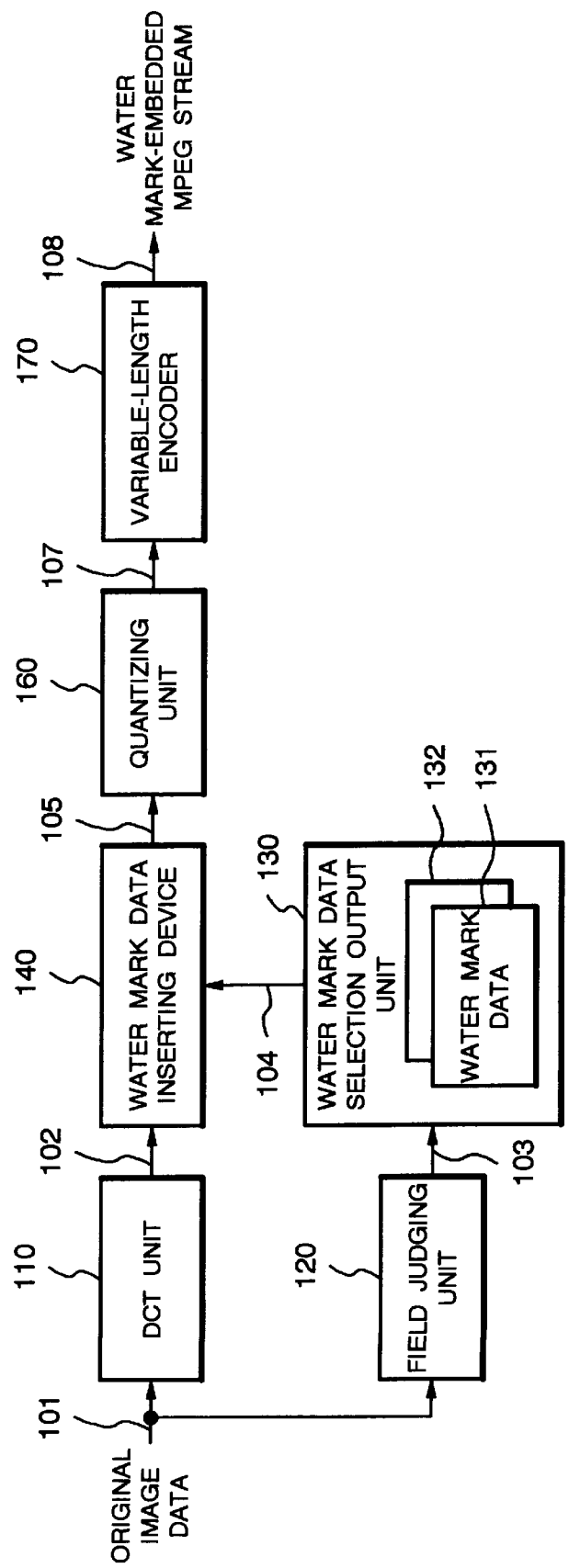
FIG. 3 is a block diagram showing a constitution of a digital data encode system according to a second embodiment of the present invention.

FIG. 3 is a block diagram showing a constitution of a digital data encode system according to a second embodiment of the present invention. With reference to FIG. 2, the encode system of the embodiment comprises a DCT unit 110, a field judging unit 120, a water mark data selection output unit 130, a water mark data inserting device 140, and a quantizing unit 160, and a variable-length encoder 170. FIG. 3 shows only the characteristic components of the embodiment, while the description of other general components is not shown there.

Instead of the inverse DCT unit 150 in the encode system of the first embodiment as shown in FIG. 1, the encode system of the second embodiment comprises the quantizing unit 160, receiving the water mark-embedded frequency component signal 105 supplied from the water mark data inserting device 140, for sampling and quantizing the signal data and the variable-length encoder 170 for, upon receipt of the signal 107 quantized by the quantizing unit 160, performing the variable-length encoding. The same numerals are attached to the DCT unit 110, the field judging unit 120, the water mark data selection output unit 130, and the water mark data inserting device 140, which are constituted in the same way as the respective components of the encode system of the first embodiment, so as to omit their description. The quantizing unit 160 and the variable-length encoder 170 may be realized by an information processor and a storage of a personal computer, a work station, or the other computer system, under the control of the control program, similarly to the other components.

Figure 4:
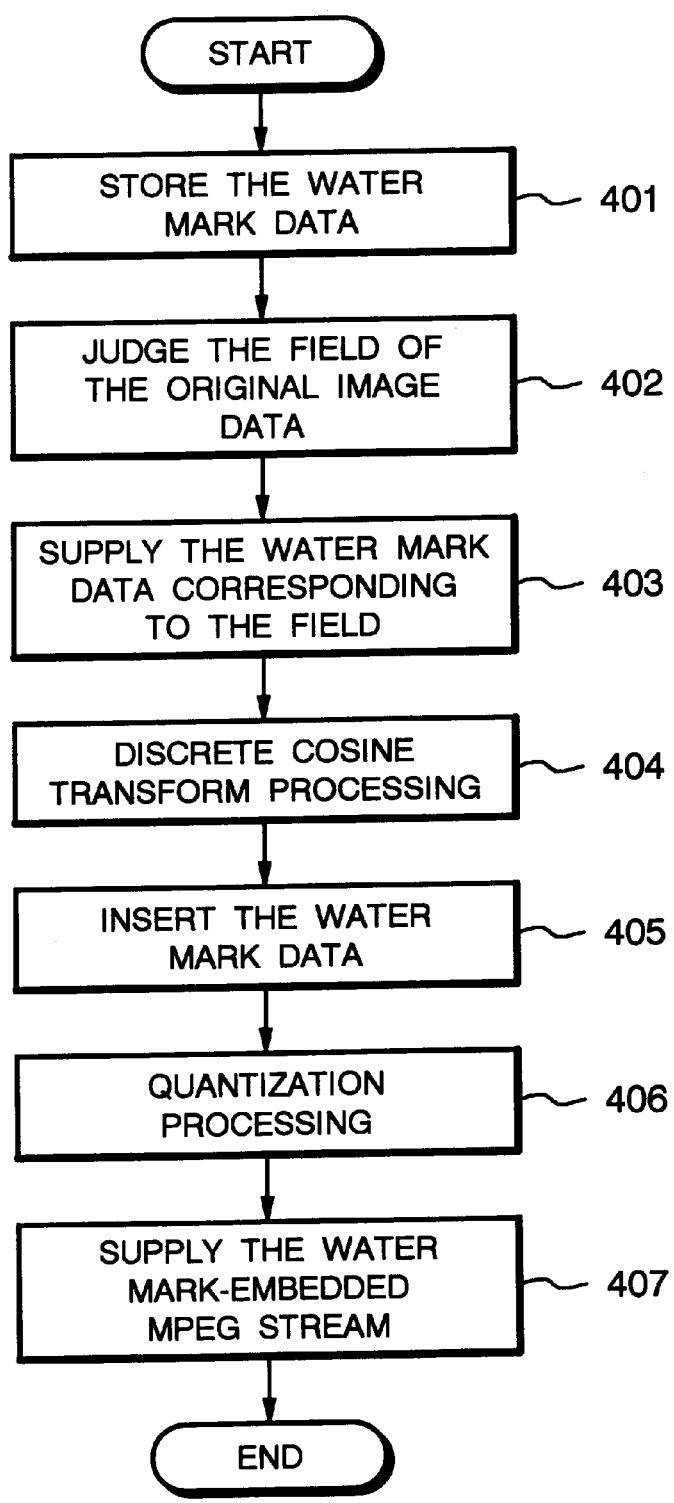
FIG. 4 is a flow chart showing an operation of the second embodiment.

Thus constituted encode system of this embodiment inserts two kinds of water mark data into the input original image data 101 by a series of processing (Steps 401 to 405) similar to the first embodiment as described with reference to FIG. 2, quantizes it (Step 406), and generates the water mark-embedded MPEG stream 108 to supply it finally (Step 407), as illustrated in the flow chart of FIG. 4.

In this embodiment, though the description has been made in the case of performing the MPEG compression with the quantizing unit 160 and the variable-length encoder 170 disposed after the water mark data inserting device 140, it is needless to say that it can be applied to another image data compression technique in the same concept. Namely, as far as it is provided with sampling means for sampling the water mark-embedded frequency component signal 105 to supply the sampling signal and image data compression means for processing the sampling signal into a data compressed signal to supply the digital data compression signal with the water mark-embedded therein, it is not restricted to this constitution of the embodiment.

Figure 5:
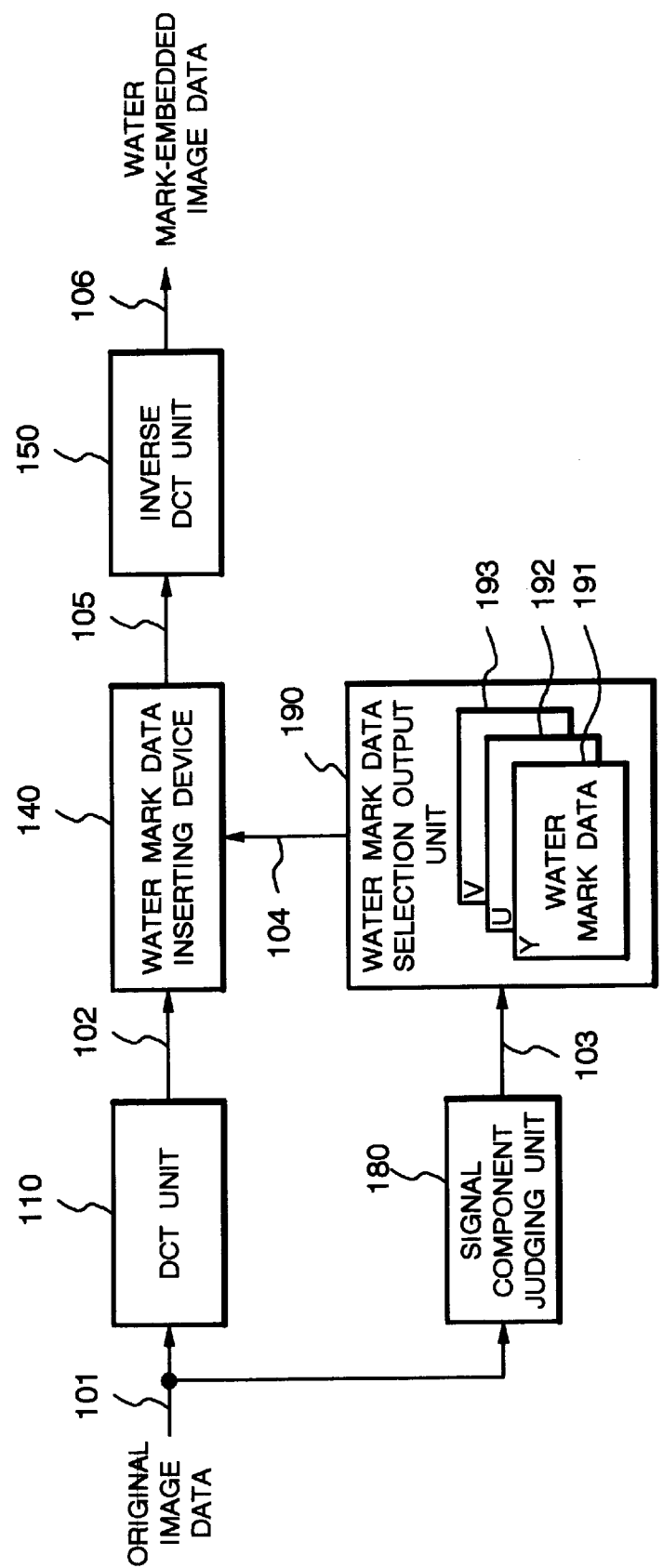
FIG. 5 is a block diagram showing a constitution of a digital data encode system according to a third embodiment of the present invention.

FIG. 5 is a block diagram showing a constitution of a digital data encode system according to a third embodiment of the present invention. With reference to FIG. 5, the encode system of the embodiment comprises a DCT unit 110, a signal component judging unit 180, a water mark data inserting device 140, and an inverse DCT unit 150. FIG. 3 shows only the characteristic components of the embodiment, while the description of other general components is not shown there.

In the above constitution, the same numerals are attached to the DCT unit 110, the water mark data inserting device 140, and the inverse DCT unit 150, which are constituted similarly to the respective components of the encode system of the first embodiment as shown in FIG. 1, thereby omitting their description. The signal component judging unit 180 and the water mark data selection output unit 190 may be realized by an information processor and a storage of a personal computer, a work station, or the other computer system, under the control of the control program, similarly to the other components.

The signal component judging unit 180, upon receipt of the original image data 101 including Y-component (brightness component), U-component(first color-difference component), and V-component(second color-difference component), judges whether the signal components under processing is Y-signal, U-signal, or V-signal, and supplies the signal component judgment information 109 indicating the judgment result to the water mark data selection output unit 190.

The water mark data selection output unit 190 is storing three kinds of water mark data 191, 192, and 193 which are prepared correspondingly to Y-component, U-component, and V-component. Upon receipt of the signal component judgment information 109 supplied from the signal component judging unit 180, the unit 190 selects the corresponding one of the water mark data 191, 192, and 193 according to the signal component indicated by the signal component judgment information 109 and supplies the result to the water mark data inserting device 140 as the water mark data 104.

An operation of the embodiment will be described with reference to the flow chart of FIG. 6. At first, three kinds of water mark data 191, 192, and 193 prepared correspondingly to Y-component, U-component, and V-component are stored in the memory of the water mark data selection output unit 190 (Step 601).

When the signal input port receives the original image data 101, the signal component judging unit 180 judges the signal component of the input original image data 101 one after another (Step 602).

According to the result judged by the signal component judging unit 180 in Step 602, the water mark data selection output unit 190 selectively assigns the water mark data corresponding to the signal component of the image data 101 and supplies the same (Step 603).

Since the processing later than the spectrum resolution of the original image data 101 by the DCT unit 110 has the same operation as that later than Step 204 according to the first embodiment as illustrated in FIG. 2, their description is omitted (Steps 604 to 606).

As mentioned above, the digital data encode system of the embodiment can obtain the water mark-embedded image data with three kinds of water mark data inserted therein correspondingly to Y-component, U-component, and V-component of the original image data 101.

Figure 7:
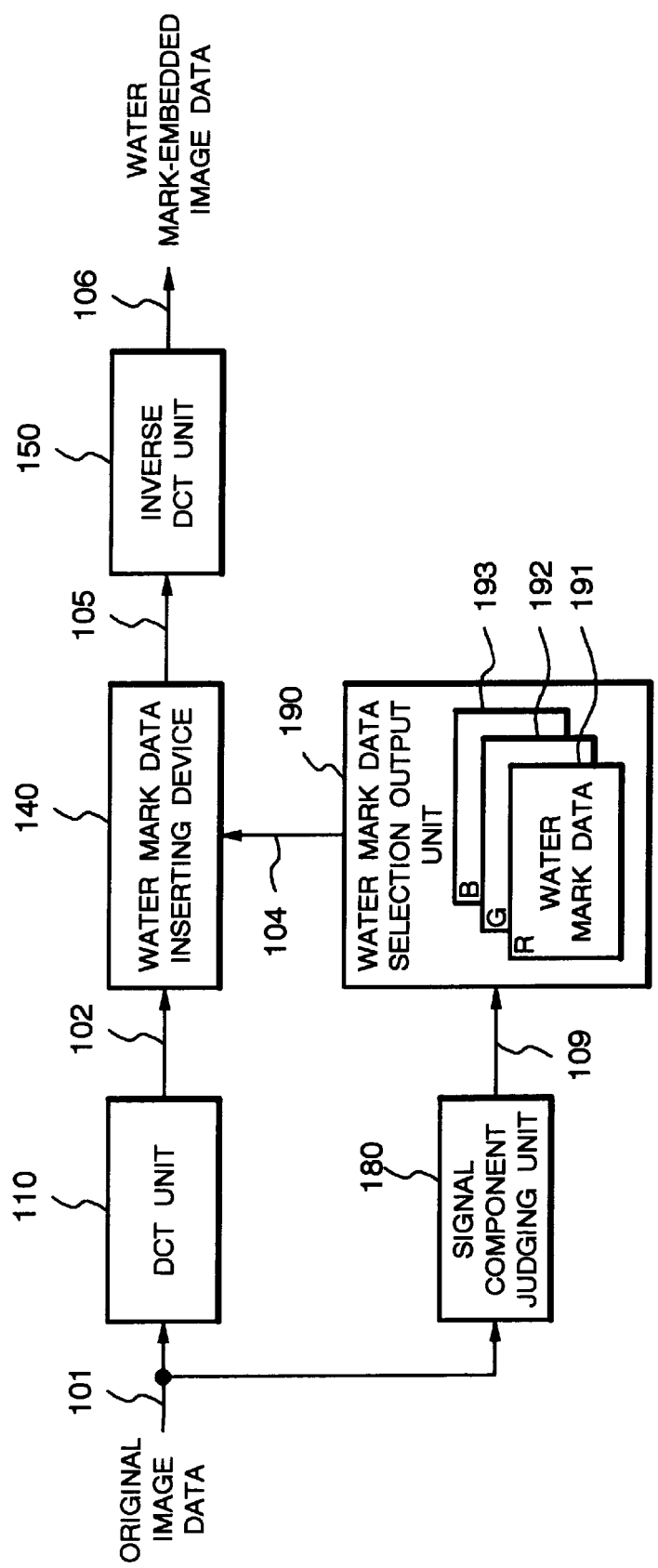
FIG. 7 is a block diagram showing a constitution of a digital data encode system according to a fourth embodiment of the present invention.

FIG. 7 is a block diagram showing a constitution of a digital data encode system according to a fourth embodiment of the present invention. With reference to FIG. 7, the encode system of the embodiment has the same structure as the encode system according to the third embodiment as shown in FIG. 5. Where, the original image data 101 to be supplied to the DCT unit 110 and the signal component judging unit 180 is image data including R-component(red component), G-component(green component), and B-component(blue component). Therefore, the signal component judging unit 180 judges whether the signal component of the original image data 101 under processing is R-signal, G-signal, or B-signal and supplies the result as the signal component judgment information 109. The water mark data selection output unit 190 stores three kinds of water mark data 191, 192, and 193 prepared correspondingly to R-component, G-component, and B-component, and selects the corresponding one of the water mark data 191, 192, and 193 according to the signal component indicated by the signal component judgment information 109, so to supply the same.

Figure 6:
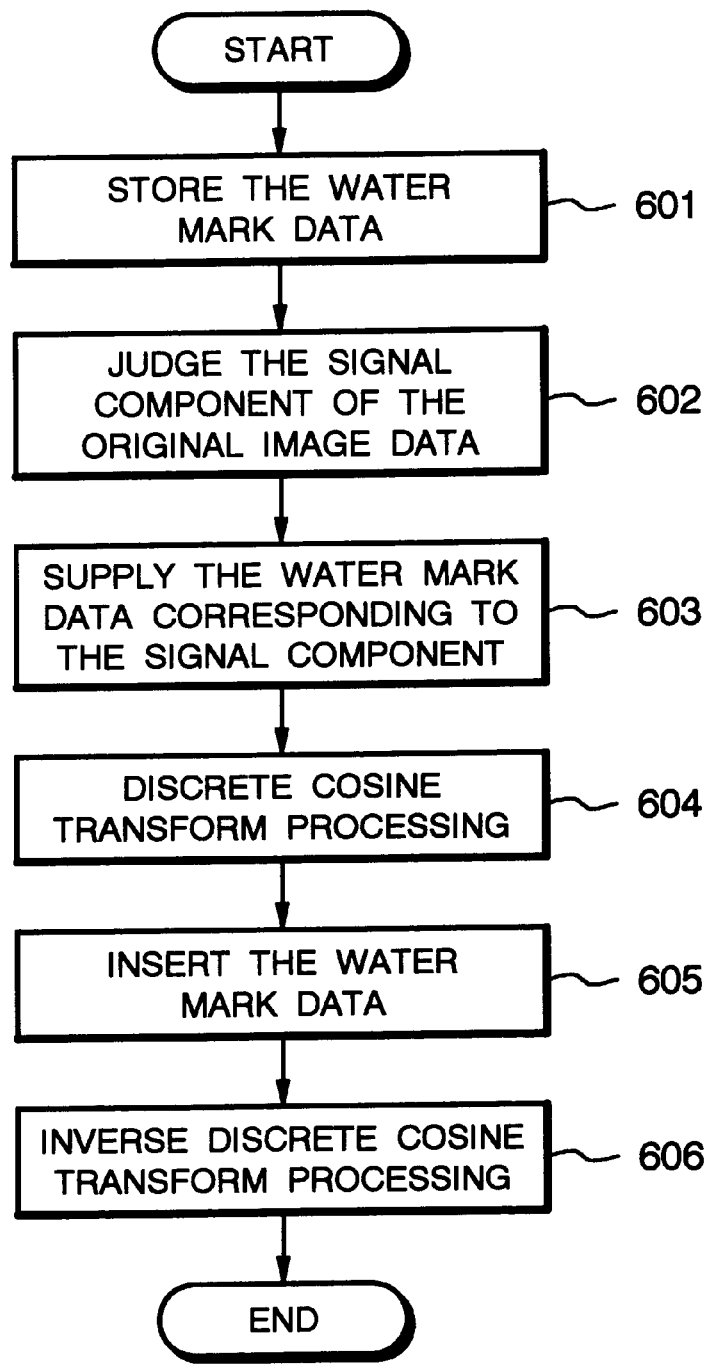
FIG. 6 is a flow chart showing an operation of the third embodiment.

The operation of the embodiment is similar to the operation of the third embodiment as shown in FIG. 6 other than the processing of dividing the signal component of the original image data 101 into R-component, G-component, and B-component, thereby omitting the description thereof.

This embodiment can be applied to the case of forming the image data by red component (R-component), green component (G-component), and blue component (B-component) like a personal computer.

As means of extracting the water mark data from the water mark-embedded image data or water mark-embedded compressed digital data generated by the above-mentioned four embodiments, the same method as the conventional technique 4 may be used, or other method with no need of any original image data may be used. For example, the technique for extracting the water mark data inserted in the frequency components, in the existing conventional technique for extracting the water mark data, may be generally applicable. Therefore, it may be used for the combination of the copy protected information included in the water mark data and the reproducing device having a particular function as mentioned in the conventional technique.

Figure 8:
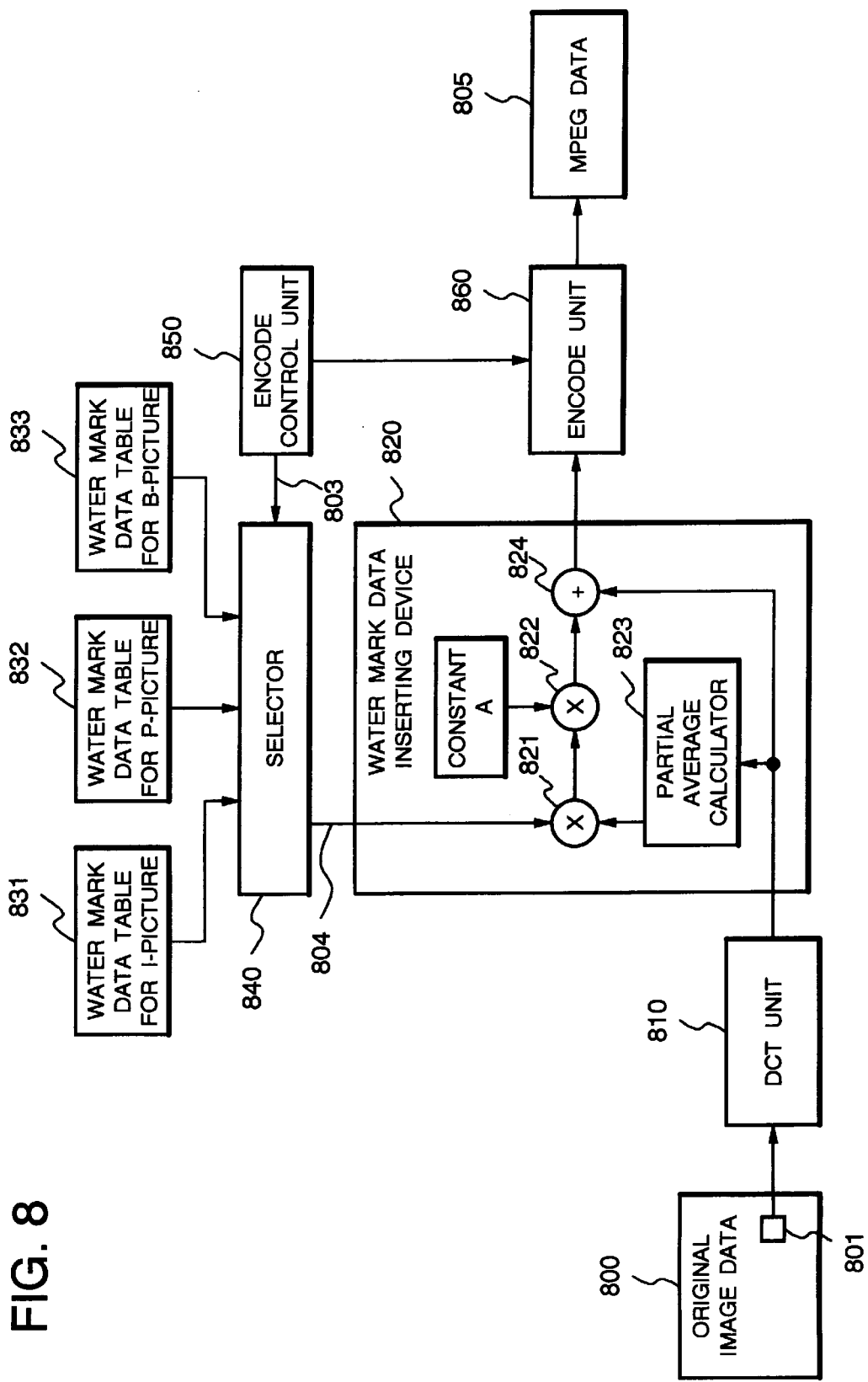
FIG. 8 is a block diagram showing a constitution of a digital data encode system according to a fifth embodiment of the present invention.
Figure 10:
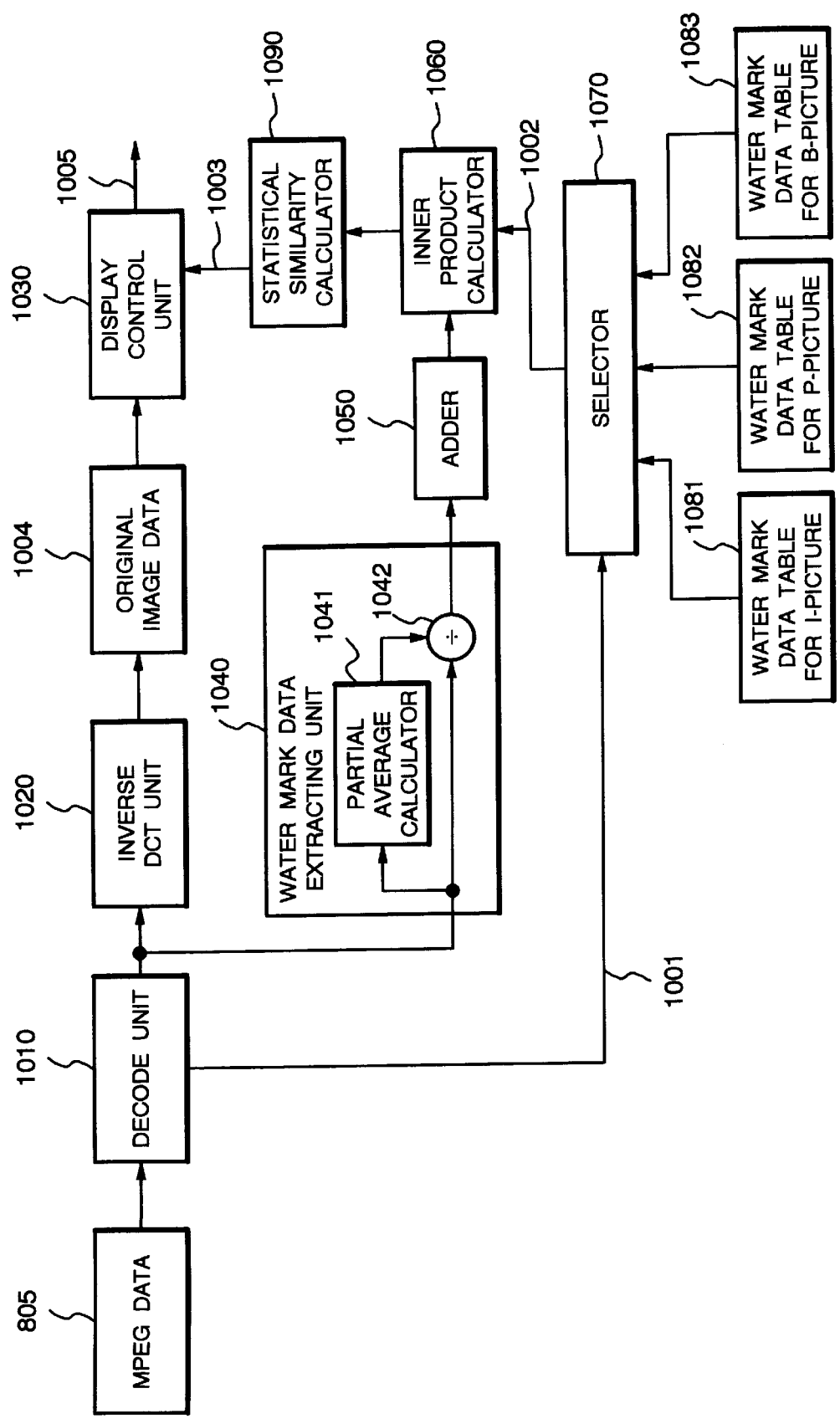
FIG. 10 is a block diagram showing a constitution of a detecting device for detecting the water mark from the data having the water mark inserted therein according to the fifth embodiment.

FIG. 8 is a block diagram showing a constitution of an inserting device for inserting water mark data in image data, in the digital data encode system according to the fifth embodiment of the present invention. FIG. 10 is a block diagram showing a constitution of a detecting device for detecting the water mark data inserted in the image data, in the encode system of the embodiment. In this embodiment, the image data subjected to discrete cosine transform (or spectrum resolution) is overlapped with the water mark, similarly to the above-mentioned four embodiments. The use of the detecting device as shown in FIG. 10 enables detection of the water mark data from the water mark-embedded image data, without necessity of the original data.

With reference to FIG. 8, the encode system of the embodiment comprises a DCT unit 810, a water mark data inserting device 820, a water mark data table for I-picture 831, a water mark data table for P-picture 832, a water mark data table for B-picture 833, a selector 840, an encode control unit 850, and an encode unit 860. FIG. 8 shows only the characteristic components of the embodiment, while the description of other general components is omitted there. Each component of the embodiment may be realized by an information processor and a storage of a personal computer, a work station, or the other computer system, under the control of the control program, in the same way as the above-mentioned other embodiments.

The DCT unit 810 takes out a block 102 of 8×8 pixels from the original image 101 that is the subject of inserting the water mark data, and performs discrete cosine transform on the image data of the block 102 (hereinafter, referred to as block image data). As means of converting block image data in the frequency components, the spectrum resolution may be performed instead of discrete cosine transform, similarly to the above-mentioned embodiments.

The water mark data inserting device 820 inserts proper water mark data of the water mark data stored in the water mark data table for I-picture 831, the water mark data table for P-picture 832, and the water mark data table for B-picture 833, into the frequency component signal of the block image data supplied from the DCT unit 810. The detailed constitution and operation of the water mark data inserting device 820 will be described below.

The water mark data table for I-picture 831 stores the water mark data for inserting I-picture, the water mark data table for P-picture 832 stores the water mark data for inserting P-picture, and the water mark data table for B-picture 833 stores the water mark data for inserting B-picture.

The selector 840 selects one water mark data of the water mark data table for I-picture 831, the water mark data table for P-picture 832, and the water mark data table for B-picture 833, to supply it to the water mark data inserting device 820 according to the picture type 803 received from the encode control unit 850.

The encode control unit 850 decides the picture type when encoding the block image data, sends the picture type signal 803 to the selector 840, and controls the encode unit 860.

The encode unit 860 encodes the output of the water mark data inserting device 840 in accordance with MPEG under the control of the encode control unit 850, and generates and supplies the MPEG data 805.

As illustrated in FIG. 8, the water mark data inserting device 820 includes a partial average calculator 823 for calculating the partial average of the absolute values of three points around the frequency component signal of the block image data supplied by the DCT unit 810 by the following formula (1);

$$\mathrm{avg}(f(i)) = (|f(i-1)| + |f(i)| + |f(i+1)|)/3 \quad (1),$$

a multiplier 821 for multiplying the water mark data 804 to be supplied by the selector 840 and the output data of the partial average calculator 823, in every element, a multiplier 822 for multiplying each output element of the multiplier 821 by the constant value α for use in changing the size of the water mark, and an adder 824 for adding the output data of the multiplier 822 and the output data of the DCT unit 810 in every element.

Thus-constituted water mark data inserting device 820 will perform the following calculation;

$$F(i) = f(i) + \mathrm{avg}(f(i)) \times w(i) \times \text{constant } \alpha \quad (2)$$

Where, i is the number of each element of the frequency component of a block of 8×8 pixels after zigzag scan, f(i) is the output data of the DCT unit 810, avg(f(i)) is the partial average of the absolute values of three points around the data, and w(i) is the value of each element of the water mark data 804 supplied by the selector 840.

Figure 9:
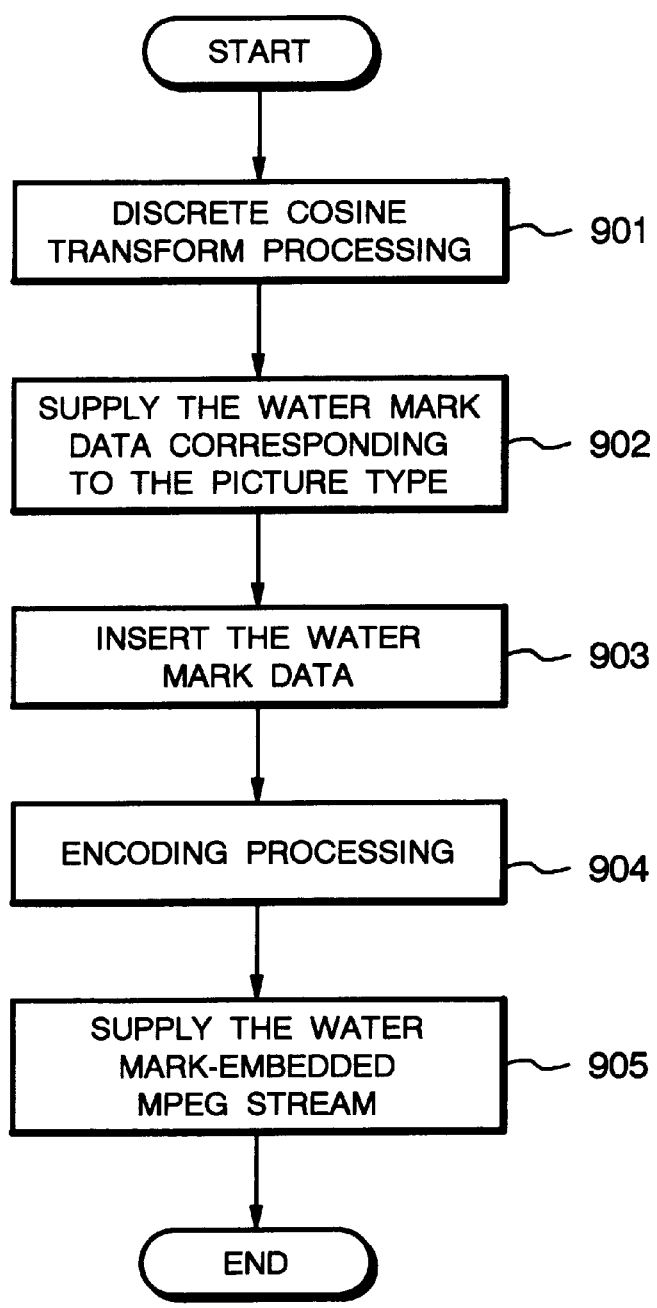
FIG. 9 is a flow chart showing an operation of the fifth embodiment.

This time, an operation of the embodiment will be described with reference to the flow chart of FIG. 9. First, based on the processing of the ordinal MPEG compression, the original image 101 is taken out in every block of 8×8 pixels, and the DCT unit 810 performs the discrete cosine transform processing on the taken out data (Step 901).

The selector 840 selects a table corresponding to the picture type, from the water mark data table for I-picture 831, the water mark data table for P-picture 832, and the water mark data table for B-picture 833, according to the picture type 803 supplied from the encode control unit 850 and supplies the water mark data 804 to the water mark data inserting device 820 (Step 902).

The water mark data inserting device 820 inserts the water mark data 804 in the block image data converted in frequency component by the DCT unit 810 (Step 903). At this time, the water mark data inserting device 820 performs the same calculation as the above mentioned formula (2).

At last, the encode unit 860 quantizes and encodes the data F(i) supplied from the water mark data inserting device 820 (Step 904), and generates and supplies the MPEG data 805 with the water mark data inserted therein (Step 905).

The description will be made about a detecting device for detecting the water mark data from the MPEG data 805 with the water mark data inserted therein by the digital data encode system of the embodiment. With reference to FIG. 10, the water mark data detecting device of the embodiment comprises a decode unit 1010, an inverse DCT unit 1020, a display control unit 1030, a water mark data extracting unit 1040, an adder 1050, an inner product calculator 1060, a selector 1070, a water mark data table for I-picture 1081, a water mark data table for P-picture 1082, a water mark data table for B-picture 1083, and a statistical similarity calculator 1090. FIG. 10 shows only the characteristic components of the detecting device of the embodiment, while the description of other general components is omitted. Each component of the detecting device of the embodiment may be realized by an information processor and a storage of a personal computer, a work station, or the other computer system, under the control of the control program.

The decode unit 1010 receives the MPEG data 805 with the water mark data inserted therein, for example, supplied from the digital data encode system according to the fifth embodiment as shown in FIG. 8, so to decode and inversely quantize it. The output data of the decode unit 1010 is transferred to the inverse DCT unit 1020 and the water mark data extracting unit 1040. The decode unit 1010 judges the picture type of the MPEG data, generates the picture type signal 1001 and supplies it to the selector 1070.

The inverse DCT unit 1020, upon receipt of the output data of the decode unit 1010, performs the inverse discrete cosine transform processing on it, to generate and supply the image data 1004. The image data 1004 is supplied to the display control unit 1030.

The water mark data extracting unit 1040 detects the data of 8×8 pixel block unit that may become a candidate of the water mark data, from the output data of the decode unit 1010 and supplies it. The detailed constitution and operation of the water mark data extracting unit 1040 will be described later.

The adder 1050, upon receipt of the data of 8×8 pixel block unit supplied from the water mark data extracting unit 1040, adds the data together for one screen in every element and supplies the addition result.

The selector 1070, upon receipt of the picture type signal 1001 from the decode unit 1010, selects one of the water mark data table for I-picture 1081, the water mark data table for P-picture 1082, and the water mark data table for B-picture 1083, according to the picture type indicated by the signal, and supplies the water mark data being stored therein.

The water mark data table for I-picture 1081, the water mark data table for P-picture 1082, and the water mark data table for B-picture 1083 respectively store the same water mark data as being stored in the water mark data table for I-picture 831, the water mark data table for P-picture 832, and the water mark data table for B-picture 833 in the encode system of FIG. 8.

The inner product calculator 1060, upon receipt of the output data of the adder 1050 and the water mark data 1002 supplied from the selector 1070, calculates the inner product of the both data and supplies it.

Based on the inner product of the output data of the adder 1050 and the water mark data 1002, supplied from the inner product calculator 1060, the statistical similarity calculator 1090 calculates the statistical similarity of the both data and supplies it.

The display control unit 1030 receives the image data 1004 supplied from the inverse DCT unit 1020 and the output data 1003 of the statistical similarity calculator 1090, and performs the output control of the display data 1005 based on the image data 1004, according to the statistical similarity shown in the output data 1003. More specifically, if the statistical similarity shown in the output data 1003 is a predetermined value or the more, the unit 1030 judges that the same water mark data as the water mark data 1002 has been inserted in the MPEG data 805. When the water mark data 1002 is of the copy-protected content, the display control unit 1030 copy protects the generated image data 1004 and supplies it as the display data 1005.

As illustrated in FIG. 10, the water mark data extracting unit 1040 includes a partial average calculator 1041 for calculating the partial average of the absolute values of three points around the data of 8×8 pixel block unit to be supplied from the decode unit 1010 by the following formula (3)

$$\mathrm{avg}(F(i))=(|F(i-1)|+|F(i)|+|F(i+1)|)/3 \quad (3)$$

and a divider 1042 for dividing the data F(i) to be supplied from the decode unit 1010 by the partial average avg (F(i)) to be supplied from the partial average calculator 1041.

Thus-constituted water mark data extracting unit 1040 will perform the following calculation;

$$W(i)=F(i)/\mathrm{avg}(F(i)) \quad (4)$$

Where, i is the number of each element of 8×8 pixel block, F(i) is the output data of the decode unit 1010, avg(F(i)) is the partial average of the absolute values of three points around the data, and W(i) is the data that would become a candidate of the water mark data to be supplied by the water mark data extracting unit 1040.

Figure 11:
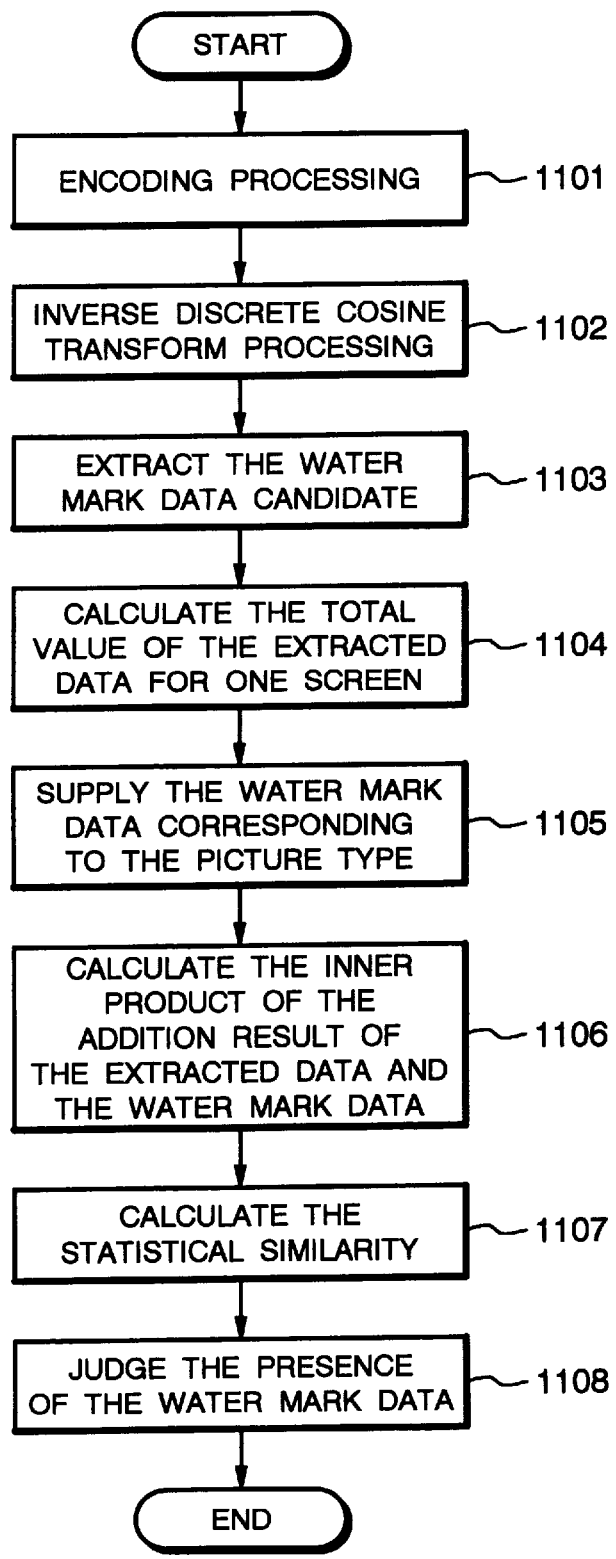
FIG. 11 is a flow chart showing an operation of the detecting device of FIG. 10.
Figure 12:
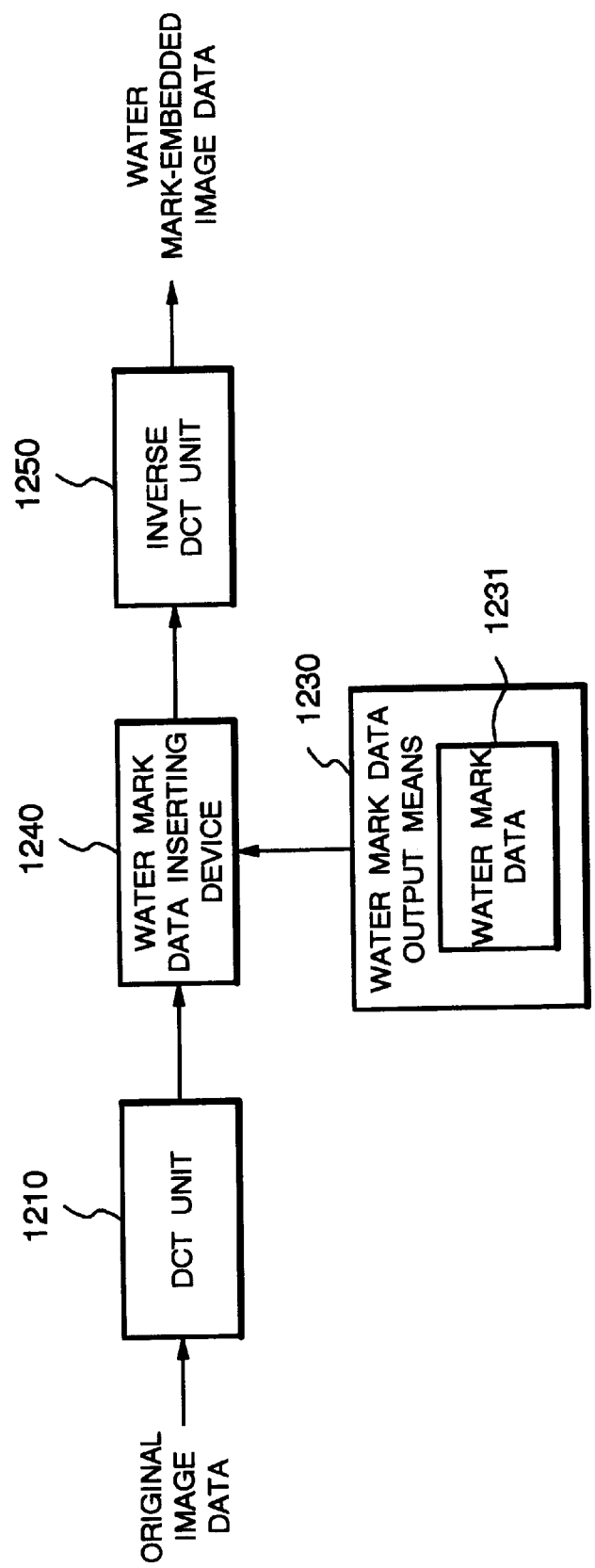
FIG. 12 is a block diagram showing a constitutional example of the conventional digital encode system.
Figure 13:
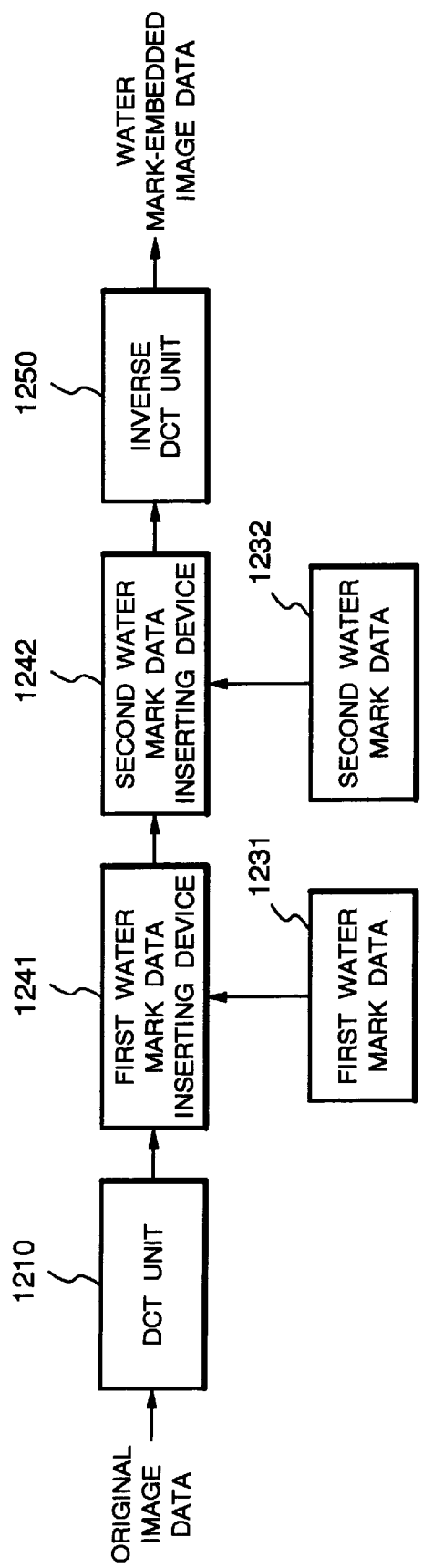
FIG. 13 is a block diagram showing another constitutional example of the conventional digital data encode system.

This time, an operation of the embodiment will be described with reference to the flow chart of FIG. 11. First, the decode unit 1010, upon receipt of the MPEG data 805 to be inspected, performs the decoding processing in accordance with MPEG on the received MPEG data 805 (Step 1101).

The inverse DCT unit 1020 performs the inverse discrete cosine transform processing on the data decoded by the decode unit 1010 and generates the image data 1004 (Step 1102).

The water mark data extracting unit 1040 receives the data F(i) of 8×8 pixel block supplied from the decode unit 1010, performs the calculation of the above formula (4), and extracts the data that would become a candidate of the water mark data inserted in the data F(i) (Step 1103).

The adder 1050 does a sum of the data values for one screen in every element with respect to the extracted data of 8×8 pixel block unit supplied from the water mark data extracting unit 1040 (Step 1104).

The selector 1070 selects a table corresponding to the picture type indicated in the picture type signal 1001, from the water mark data table for I-picture 1081, the water mark data table for P-picture 1082, and the water mark data table for B-picture 1083, according to the picture type signal 1001 supplied from the decode unit 1010, and supplies the water mark data 1002 to the inner product calculator 1060 (Step 1105).

The inner product calculator 1060 calculates the inner product of the total sum of the extracted data for one screen calculated by the adder 1050 and the water mark data 1002 supplied from the selector 1070 (Step 1106). The statistical similarity calculator 1090 calculates the statistical similarity according to the inner product value supplied from the inner product calculator 1060 (Step 1107).

At last, the display control unit 1030 judges whether the same water mark data as the water mark data 1002 has been inserted in the MPEG data 805 or not, depending on the statistical similarity shown in the output data 1003 of the statistical similarity calculator 1090 (Step 1108) and performs a proper display control depending on the judgment result.

Thus, the water mark data is detected from the MPEG data with the water mark data inserted therein and a proper operation can be performed in accordance with the content thereof. The detecting device of the embodiment needs no original image data in detecting the water mark data. Therefore, the detecting device can be used in the reproducing device of a general user having no original image data for the detection of the water mark data.

Though the embodiment adopts MPEG data as the data to be transferred from the water mark data inserting device to the detecting device, it is needless to say that it can be applied to the other image data compression technique by the similar concept. Further, it may be constituted in that the water mark data is inserted before performing the inverse discrete cosine transform processing, thereby transferring the data as the water mark-embedded image data.

As set forth hereinabove, the digital data encode system of the present invention is capable of inserting a plurality of water mark data in one image data, thereby inserting a plurality of information therein by the water mark data.

Since the present invention divides the image data according to the field, signal component, and frame, and inserts each water mark data corresponding to the division by use of one water mark data inserting device, it can realize the insertion of a plurality of water mark data into one original image data at the same circuit size as the conventional digital data encode system.

Since the present invention divides the image data according to the field, signal component, and frame, and inserts each different water mark data for every dividing unit, it can reduce the deterioration of the image quality compared with the case of inserting a plurality of water mark data in every division.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A digital data encode system having a water mark data inserting device for inserting water mark data into digital data signals having a series of field data, comprising:
   a water mark data inserting control means for controlling inserting of said water mark by said water mark data inserting device,
   wherein said water mark data inserting control means divides the digital data signals by a predetermined reference and inserts a plurality of different water mark data prepared correspondingly to the division into the respective digital data of the corresponding divisions by use of said water mark data inserting device,
   said digital data signals are of digital data signal having a series of field data consisting of odd fields and even fields of a series of image frames, and
   said water mark data inserting control means inserts first and second water mark data different from each other and prepared for every odd field and every even field into the respective corresponding fields, by use of said water data inserting device.

2. A digital data encode system having a water mark data inserting device for inserting water mark data into digital data signals having a series of field data, comprising:
   a water mark data inserting control means for controlling inserting of said water mark by said water mark data inserting device,
   wherein said water mark data inserting control means divides the digital data signals by a predetermined reference and inserts a plurality of different water mark data prepared correspondingly to the division into the respective digital data of the corresponding divisions by use of said water mark data inserting device,
   said digital data signal are of a digital data signal having a series of field data consisting of odd fields and even fields in a series of image frames, and
   said water mark data inserting control means comprising
      a field judging means for judging whether the field data under processing is of an odd field or an even field upon receipt of the digital data signals, and
      a water mark data selection output means, storing first and second water mark data different from each other and prepared for every odd field and every even field, for supplying the first water mark data to said water mark data inserting device when the judgment result designates the odd field, or supplying the second water mark data to said water mark data inserting device when the judgment result designates the even field, depending on the judgment result by said field judging means.

3. A digital data encode system having a water mark data inserting device for inserting water mark data into digital data signals having a series of field data, comprising:
   a water mark data inserting control means for controlling inserting of said water mark by said water mark data inserting device,
   wherein said water mark data inserting control means divides the digital data signals by a predetermined reference and inserts a plurality of different water mark data prepared correspondingly to the division into the respective digital data of the corresponding divisions by use of said water mark data inserting device,
   said water mark data inserting control means comprising
      a signal component judging means for, upon receipt of the digital data signals, judging whether the signal component of the digital data signal under processing is a brightness component, a first color-difference component, or a second color-difference component, and
      a water mark data selection output means, storing three kinds of different water mark data prepared for a respective one of the signal components, for supplying the water mark data prepared correspondingly to the brightness component to said water mark data inserting device when the judgment result designates the brightness component, supplying the water mark data prepared correspondingly to the first color-difference to said water mark data inserting device when the judgment result designates the first color-difference component, or supplying the water mark data prepared correspondingly to the second color-difference component to said water mark data inserting device when the judgment result designates the second color-difference component, depending on the judgment result of said signal component judgment means.

4. A digital data encode system having a water mark data inserting device for inserting water mark data into digital data signals having a series of field data, said digital data signals being of a digital data signal consisting of a series of image frames, comprising:

a water mark data inserting control means for controlling inserting of said water mark by said water mark data inserting device;

an encoding means for encoding the digital signals with the water mark data inserted therein by use of said water mark data inserting device; and an encode controlling means for controlling said encoding means so as to perform encoding processing in a plurality of kinds of picture types corresponding to the encoding methods, said water mark data inserting control means comprising water mark data storing means for storing a plurality of different water mark data prepared correspondingly to a plurality of picture types for use in said encoding means and said encode controlling means, and a water mark data selection output means for, depending on the picture type decided by said encode controlling means, selecting the corresponding water mark data from said water mark data storing means and supplying it to said water mark data inserting device,.

wherein said water mark data inserting control means divides the digital data signals by a predetermined reference and inserts a plurality of different water mark data prepared correspondingly to the division into the respective digital data of the corresponding divisions by use of said water mark data inserting device.

5. A digital data encode system having a water mark data inserting device for inserting water mark data into digital data signals having a series of field data, said digital data signals being of a digital data signal consisting of a series of image frames, comprising:

a water mark data inserting control means for controlling inserting of said water mark by said water mark data inserting device;

a spectrally-resolving means for dividing the image of the digital data signals into blocks of a predetermined size, spectrally resolving the corresponding digital data signals in every block, and supplying the obtained resolved signals to said water mark data inserting device as a subject of inserting the water mark data therein, an encoding means for encoding the digital signals with the water mark data inserted therein by use of said water mark data inserting device, and an encode controlling means for controlling said encoding means so as to perform encoding processing in a plurality of kinds of picture types, said water mark data inserting control means comprising water mark data storing means for storing a plurality of different water mark data prepared correspondingly to a plurality of picture types of use in said encoding means and said encode controlling means, and a water mark data selection output mean for, depending on the e picture type decide d by said encode controlling means, selecting the corresponding water mark data from said water mark data storing means and supplying it to said water mark data inserting device, said water mark data inserting device comprising a partial average calculator for calculating the average of the e absolute values of three points around each element in the resolved signals supplied from said spectrally-resolving means, as a partial average, a first multiplier for multiplying the water mark data supplied from said water mark data inserting control means by the output data of said partial average calculator in every element, a second multiplier for multiplying each element of the output data of said firs t multiplier by a predetermined constant, and an adder for adding the output data of said second multiplier and the resolved signals supplied from said spectrally-resolving means in every element, wherein said water mark data inserting control means divides the digital data signals by a predetermined reference and inserts a plurality of different water mark data prepared correspondingly to the division into the respective digital data of the corresponding divisions by use of said water mark data inserting device.

6. A digital data encode system having a water mark data inserting unit including a water mark data a inserting control means for inserting water mark data into digital data signals having a series of field data by control of a water mark data inserting device and a water mark data detecting unit including a water mark data detecting means for detecting means for detecting the water mark data from the digital data signals with the water mark data added thereto by said water mark data inserting unit;

said digital data signals being of a digital data signal consisting of a series of image frames;

said water mark data inserting unit further comprising an encoding means for encoding the digital data signals with the water mark data inserted therein by use of said water mark data inserting device, and an encode controlling means for controlling said encoding means so as to perform encoding processin in a plurality of kinds of picture types corresponding to the encoding methods;

said water mark data inserting control means comprising first water mark data storing means for storing a plurality of different water mark data prepared correspondingly to a plurality of picture types for use in said encoding means and said encode controlling means, and a water mark data selection output means for, depending on the picture type decided by said encode controlling means, selecting the corresponding water mark data from said first water mark data storing means and supplying it to said water mark data inserting device, said water mark detecting unit comprising a decoding means for decoding the digital data signals encoded by said encoding means of said water mark data inserting device, and a display controlling means for controlling a display depending on the data decoded by said decoding means according to the content of the water mark data inserted in the digital data signals or according to its presence;

said water mark data detecting means comprising a water mark data extracting device for extracting candidate data, that is a candidate of the water mark data, from the data decoded by said decoding means, a second water mark data storing means for storing the same water mark data as the plurality of water mark data stored in said first water mark data storing means of said water mark data inserting control means in said water mark data inserting device, a water mark data selection output means for selecting the corresponding water mark data from said second water mark data storing means according to the picture type in the encoding processing to be recognized in the decoding processing by said decoding means and supplying it, and a statistical similarity judging means for making a comparison between the candidate data extracted by said water mark data extracting device and the water mark data supplied by said water mark data selection output means, judging the statistical similarity thereof, and notifying said display controlling means of the judgment result.

7. A digital data encode system as claimed in claim 6, said water mark data inserting unit further comprising a spectrally-resolving means for dividing the image of the digital data signals into blocks of a predetermined size, spectrally resolving the corresponding digital data signals in every block, and supplying the obtained resolved signals to said water mark data inserting device as a subject of inserting the water mark data therein;

said water mark data inserting device comprising a partial average calculator for calculating the average of the absolute values of three points around each element in the resolved signals supplied from said spectrally-resolving means, as a partial average, a first multiplier for multiplying the water mark data supplied from said water mark data inserting control means by the output data of said partial average calculator in every element, a second multiplier for multiplying each element of the output data of said first multiplier by a predetermined constant, and an adder for adding the output data of said second multiplier and the resolved signals supplied from said spectrally-resolving means in every element;

said water mark data extracting device of said water mark data detecting means comprising a partial average calculator for calculating the average of the absolute values of three points around the block data decoded by said decoding means as a partial average, and a divider for dividing the block data decoded by said decoding means by the output data of said partial average calculator.

8. A water mark data inserting method for inserting water mark data in digital data signals having a series of field data, consisting of odd fields and even fields of a series of image frames, by use of a water mark data inserting device, comprising:

dividing the digital data signals by a predetermined reference;

inserting a plurality of different water mark data prepared correspondingly to the division into the respective digital data of the corresponding divisions, by use of said water mark data inserting device;

storing first and second water mark data different from each other and prepared for every odd field and every even field;

judging whether the digital data signal is of the odd field or the even field one after another;

selecting one of the first and second water mark data as the water mark data to be inserted in the digital data signals, according to the judgment result in said field judging step;

spectrally resolving the digital data signals; and with respect to the frequency analyzed data, as a subject of inserting the water mark data therein, obtained as a result of the spectrum resolution in said spectrally resolving step, inserting the first water mark data into the frequency analyzed data of the odd field of inserting the second water mark data into the frequency analyzed data of the even field, according to the selection result in said water mark data selecting step.

9. A water mark data inserting method for inserting water mark data in digital data signals having a series of field data by use of a water mark data inserting device, comprising:

dividing the digital data signals by a predetermined reference;

inserting a plurality of different water mark data prepared correspondingly to the division into the respective digital data of the corresponding divisions, by use of said water mark data inserting device;

storing three kinds of different water mark data prepared for every brightness component, first color-difference component, a second color-difference component in the signal components of the digital data signals;

judging the signal components of the digital data signals one after another;

selecting one of the three kinds of water mark data as the water mark data to be inserted in the digital signal data, according to the judgment result in said signal component judging step;

spectrally resolving the digital data signals; and with respect to the frequency analyzed data, as a subject of inserting the water mark data therein, obtained as a result of the spectrum resolution in said spectrally resolving step, inserting the water mark data prepared correspondingly to the brightness component into the data of the brightness component, inserting the water mark data prepared correspondingly to the first color-difference component into the data of the first color-difference component, or inserting the water mark data prepared correspondingly to the second color-difference component into the data of the second color-difference component, according to the selection result in said water mark data selecting step.

10. A water mark data inserting method for inserting water mark data in digital data signals having a series of field data by use of a water mark data inserting device, comprising:

dividing the digital data signals by a predetermined reference;

inserting a plurality of different water mark data prepared correspondingly to the division into the respective digital data of the corresponding divisions, by use of said water mark data inserting device;

storing a plurality of different water mark data prepared for every plurality of picture types corresponding to the encoding methods in encoding the digital data signals, judging the signal components of the digital data signals one after another, selecting one of the three kinds of water mark data, as the water mark data to be inserted in the digital signal data, according to the judgment result in said signal component judging step, spectrally resolving the digital data signals, and with respect to the frequency analyzed data, as a subject of inserting the water mark data therein, obtained as a result of the spectrum resolution in said spectrally resolving step, inserting the water mark data prepared correspondingly to the picture type, according to the selection result in said water mark data selecting step.

11. A computer readable memory for storing a control program for controlling a digital data encode system having a water mark data inserting control means for inserting water mark data into digital data signals having a series of field data by use of a water mark data inserting device, said control program comprising:

dividing the digital data signals by a predetermined reference;

inserting a plurality of different water mark data prepared correspondingly to the division into the respective digital data of the corresponding division, by use of said water mark data inserting device;

storing first and second water mark data different from each other and prepared for every odd field and every even field, with respect to the digital data signals having a series of field data consisting of odd fields and even fields of a series of image frames;

judging whether the digital data signal is of the odd field or the even field one after another;

selecting one of the first and second water mark data, as the water mark data to be inserted in the digital signal data, according to the judgment result in said field judging step;

spectrally resolving the digital data signals; and with respect to the frequency analyzed data, as a subject of inserting the water mark data, obtained as a result of the spectrum resolution in said spectrally resolving step, inserting the first water mark data into the frequency analyzed data of the odd field or inserting the second water mark data into the frequency analyzed data of the even field, according to the selection result in said water mark data selecting step.

12. A computer readable memory for storing a control program for controlling a digital data encode system having a water mark data inserting control means for inserting water mark data into digital data signals having a series of field data by use of a water mark data inserting device, said control program comprising:

dividing the digital data signals by a predetermined reference;

inserting a plurality of different water mark data prepared correspondingly to the division into the respective digital data of the corresponding division. by use of said water mark data inserting device;

storing three kinds of different water mark data prepared for every brightness component, first color-difference, and second color-difference component in the signal components of the digital data signals;

judging the signal components of the digital data signals one after another;

selecting one of the three kinds of water mark data as the water mark data to be inserted in the digital signal data, according to the judgment result in said signal component judging step;

spectrally resolving the digital data signals; and with respect to the frequency analyzed data, as a subject of inserting the water mark data, obtained as a result of the spectrum resolution in said spectrally resolving step, inserting the water mark data prepared correspondingly to the brightness component into the data of the brightness component, inserting the water mark data prepared correspondingly to the first color-difference component into the data of the first color-difference component, or inserting the water mark data prepared correspondingly to the second color-difference component into to the data of the second color-difference component, according to the selection result in said water mark data selecting step.

13. A computer readable memory for storing a control program for controlling a digital data encode system having a water mark data inserting control means for inserting water mark data into digital data signals having a series of field data by use of a water mark data inserting device, said control program comprising:

dividing the digital data signals by a predetermined reference;

inserting a plurality of different water mark data prepared correspondingly to the division into the respective digital data of the corresponding division, by use of said water mark data inserting device;

storing a plurality of different water mark data prepared for every plurality of picture types corresponding to the encoding methods of encoding the digital data signals;

judging the signal components of the digital data signals one after another;

selecting one of the three kinds of water mark data, as the water mark data to be inserted in the digital signal data, according to the judgment result in said signal component judging step;

spectrally resolving the digital data signals; and with respect to the frequency analyzed data, as a subject of inserting the water mark data, obtained as a result of the spectrum resolution in said spectrally resolving step, inserting the water mark data prepared correspondingly to the picture type, according to the selection result in said water mark data selecting step.

\* \* \* \* \*